United States Patent
Sorimoto

(10) Patent No.: US 11,345,071 B2
(45) Date of Patent: May 31, 2022

(54) RETAINING UNIT, AND EJECTION MECHANISM OF MOLDING DIE ASSEMBLY INCLUDING RETAINING UNIT

(71) Applicant: Technocrats Corporation, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 0 days.

(21) Appl. No.: 16/234,417

(22) Filed: Dec. 27, 2018

(65) Prior Publication Data

US 2019/0126527 A1 May 2, 2019

Related U.S. Application Data

(63) Continuation of application No. PCT/JP2017/015481, filed on Apr. 17, 2017.

(51) Int. Cl.
*B29C 45/44* (2006.01)
*B29C 45/40* (2006.01)
(Continued)

(52) U.S. Cl.
CPC .......... *B29C 45/4435* (2013.01); *B29C 45/26* (2013.01); *B29C 45/4005* (2013.01); *F16B 21/165* (2013.01)

(58) Field of Classification Search
CPC .......... B29C 45/4435; B29C 2045/445; B29C 33/442; B29C 33/48; B29C 39/34; B29C 43/42; B29C 45/40; B29C 45/44
See application file for complete search history.

(56) References Cited

U.S. PATENT DOCUMENTS 3,707,303 A    12/1972   Petri
5,232,718 A *   8/1993   Miyazawa .............. B29C 45/33
                                                            425/DIG. 58
(Continued)

FOREIGN PATENT DOCUMENTS

CN      106103038 A    11/2016
CN      106239844 A    12/2016
(Continued)

OTHER PUBLICATIONS

Extended European Search Report, Application No. 17906426, dated Jul. 5, 2019.
(Continued)

*Primary Examiner* — Niki Bakhtiari
*Assistant Examiner* — Nicholas J Chidiac
(74) *Attorney, Agent, or Firm* — Hamilton, Brook, Smith & Reynolds, P.C.

(57) ABSTRACT

A retaining unit comprising: a first member configured to be movable; a second member used in an unmovable fixed state; and a pressing element attached to the second member, and configured to press the first member to engage the first member with the second member, wherein the retaining unit is configured such that the first member can be moved by release of the engagement with the second member when a force at a predetermined level or higher is applied in a movement direction of the first member, and the pressing element is assembled with the second member to constitute a unit.

16 Claims, 25 Drawing Sheets

(51) Int. Cl.
  *F16B 21/16* (2006.01)
  *B29C 45/26* (2006.01)

(56) References Cited

U.S. PATENT DOCUMENTS

| | | | | |
|---|---|---|---|---|
| 6,491,512 | B2* | 12/2002 | Vandenberg | ........ B29C 45/4005 |
| | | | | 425/444 |
| 8,029,267 | B2* | 10/2011 | Takao | ................ B29C 45/4435 |
| | | | | 425/444 |
| 2002/0098259 | A1* | 7/2002 | Vandenberg | ........ B29C 45/4005 |
| | | | | 425/556 |
| 2010/0221379 | A1 | 9/2010 | Takao | |
| 2011/0311665 | A1* | 12/2011 | Kimura | ................ B29C 33/442 |
| | | | | 425/3 |
| 2012/0070525 | A1* | 3/2012 | Wang | ................... B29C 33/306 |
| | | | | 425/161 |
| 2013/0075043 | A1 | 3/2013 | Wagner | |
| 2018/0243960 | A1 | 8/2018 | Sorimoto | |
| 2019/0126526 | A1 | 5/2019 | Sorimoto | |

FOREIGN PATENT DOCUMENTS

| | | |
|---|---|---|
| CN | 106426673 A | 2/2017 |
| CN | 206048721 U | 3/2017 |
| EP | 3366447 A | 8/2018 |
| GB | 284493 A | 2/1928 |
| JP | 58078735 * | 5/1983 |
| JP | 58078735 | 5/1983 |
| JP | 62130817 A | 6/1987 |
| JP | 63006823 U | 1/1988 |
| JP | 02009520 U | 1/1990 |
| JP | 04090519 U1 | 8/1992 |
| JP | 05200806 A | 8/1993 |
| JP | H08-216203 A | 8/1996 |
| JP | 09-085786 A | 3/1997 |
| JP | H11-163012 A | 6/1999 |
| JP | 2003320561 A | 11/2001 |
| JP | 2002-036314 A | 2/2002 |
| JP | 2002172641 A | 6/2002 |
| JP | 3117386 | 1/2006 |
| JP | 2010-083033 A | 4/2010 |
| JP | 2010155381 A | 7/2010 |
| JP | 2014097628 A | 5/2014 |
| JP | 2014172378 A | 9/2014 |
| JP | 5858437 B | 2/2016 |
| JP | 2017036768 A | 2/2017 |
| JP | 2017056474 A | 3/2017 |
| KR | 2019-970028115 U | 7/1997 |
| KR | 10-20090067841 A | 6/2009 |
| WO | 2008143214 A | 11/2008 |
| WO | 2018179027 A1 | 10/2018 |
| WO | WO2018193502 A1 | 10/2018 |

OTHER PUBLICATIONS

English translation of the Written Opinion of the International Searching Authority for International Application No. PCT/JP2017/015481, entitled "Retaining Unit, and Ejection Mechanism of Molding Die Assembly Including Retaining Unit," 7 pages, dated Feb. 22, 2019.
International Search Report for International Application No. PCT/JP2017/015481, entitled "Retaining Unit, and Ejection Mechanism of Molding Die Assembly Including Retaining Unit," 4 pages, dated Jun. 20, 2017.
Office Action, U.S. Appl. No. 16/234,392, dated Aug. 21, 2019.
Office Action, U.S. Appl. No. 16/234,392, dated Nov. 13, 2019.
Both are in reference to U.S. Appl. No. 16/234,392, this is a transcription error that was discussed in the interview on Mar. 12, 2020 . Office Action, U.S. Appl. No. 16/234,293, dated Aug. 21, 2019.
U.S. Notice of Allowance for U.S. Appl. No. 16/234,392, entitled "Undercut Processing Mechanism and Molding Die Assembly," dated Sep. 16, 2021.

* cited by examiner

RETAINING UNIT, AND EJECTION MECHANISM OF MOLDING DIE ASSEMBLY INCLUDING RETAINING UNIT

CROSS REFERENCE TO THE RELATED APPLICATION

This application is a continuation of International Application No. PCT/JP2017/015481, which designated the United States and was filed on Apr. 17, 2017, published in Japanese, the entire content of which is herein incorporated by reference as a part of this application.

BACKGROUND OF THE INVENTION

Field of the Invention

The present invention relates to a retaining unit, an ejection mechanism of a molding die assembly including the retaining unit, a fixed-side die, a movable-side die, a molding die assembly, and a molded article.

Description of Related Art

There exists an injection molding die (die assembly) having a two-stage ejection mechanism. A conventional two-stage ejection mechanism is configured such that two ejector pins are attached to two ejector plates respectively, a molded article is ejected by the first ejector pin, and thereafter, the second ejector plate is pushed up by the first ejector plate to further eject the molded article by the second ejector pin. In such an ejection mechanism, it is difficult to reduce the size of the mechanism due to the use of two ejector plates.

In order to solve the problem related to the two-stage ejection mechanism having two ejector plates, developed is a two-stage ejection mechanism having a single ejector plate and an ejector pin which is detachably attached to the ejector plate and of which the movement amount is restricted (see, for example, JP Laid-open Patent Publication No. 2014-97628).

The two-stage ejection mechanism described in JP Laid-open Patent Publication No. 2014-97628 has a characteristic feature in that the ejector pin and the ejector plate are detachably connected with each other via a magnetic force. By this configuration, it is possible to move the ejector pin and the ejector plate in an integrated manner. Further, it is also possible to move only the ejector plate while restricting the movement of the ejector pin. This attachment/detachment mechanism of the ejector pin and the ejector plate can be interpreted as a retaining mechanism that retains the connected state of the ejector pin and the ejector plate until reaching a predetermined position.

In the case of using a die with the retaining mechanism attached thereto, it is important that the retaining mechanism can be assembled easily to the dye assembly. However, simplicity in assembling process has not been concerned in conventional retaining mechanisms including that of JP Laid-open Patent Publication No. 2014-97628. In addition, considering the assembly to a die or the like, a retaining mechanism should have versatility and a structure that allows downsizing. For example, simple configuration of the retaining mechanism using a magnetic force is preferable for downsizing dies. However, since the magnetic force cannot be changed, it is necessary to, for respective dies, prepare retaining mechanisms having magnetic forces suited thereto. Thus, there is a room for improvement in usability, including versatility.

An object of the present invention is to provide a retaining unit that can be easily assembled to a die assembly and has high versatility. Another object of the present invention is to provide a retaining unit that can be assembled to a die assembly in a compact configuration, an ejection mechanism of a molding die assembly including the same retaining unit, a fixed-side die, a movable-side die, a molding die assembly, and a molded article.

DISCLOSURE OF THE INVENTION

A retaining unit of the present invention includes: a first member configured to be movable; a second member used in a unmovable fixed state; and a pressing element attached to the second member, and configured to press the first member to engage the first member with the second member, wherein the retaining unit is configured such that the first member can be moved by release of the engagement with the second member when a force at a predetermined level or higher is applied in a movement direction of the first member, and the pressing element is assembled with the second member to constitute a unit.

In the retaining unit, the first member may have a recess into which at least a distal end portion of the pressing element is fitted, and the pressing element may press the first member in a state in which at least the distal end portion of the pressing element is fitted in the recess.

In the retaining unit, the pressing element may be detachably assembled to the second member.

In the retaining unit, the pressing element may be configured such that a pressing force thereof to press the first member is adjustable in a state in which the pressing element is assembled in the second member.

In the retaining unit, the pressing element may be assembled to the second member via a fixing element (fixture), and the fixing element may also function as an element by which the pressing force of the pressing element is adjusted.

In the retaining unit, the first member may have a body portion and an enlarged portion larger than the body portion, and the pressing element may be assembled so as to press the enlarged portion.

In the retaining unit, the second member may be a ring-shaped member disposed so as to surround a pressed portion of the first member, where one or more of the pressing element are assembled to the second member, and each pressing element is configured such that the distal end portion thereof is projectable from an inner circumferential surface of the second member.

In the retaining unit, the pressing element may be a ball plunger.

In an alternative configuration of the retaining unit, the first member is used in a fixed unmovable state, and the second member is movable.

The present invention provides an ejection mechanism of a molding die assembly to mold a molded article by a fixed-side die and a movable-side die, wherein the ejection mechanism comprises an ejector plate assembled (equipped) with the above-described retaining unit, wherein the second member is fixed to the ejector plate, and the first member functions as an ejector pin.

The ejection mechanism of the molding dye assembly may further includes one or a plurality of energizing element configured to energize the first member toward a position where the first member is engaged with the second member, wherein the ejector plate has a recess into which the second member is fitted, and the second member is fixed in a state fitted into the recess.

The ejection mechanism of the molding dye assembly may further include a holder which houses the energizing element, wherein the holder has an outer holder attached to the movable-side die or the ejector plate, and an inner holder slidably engaged with the outer holder, and the holder restricts a sliding amount of the inner holder relative to the outer holder, to restrict an amount of extension of the energizing element housed in the holder to be within a predetermined range.

In the ejection mechanism of the molding die assembly, the first member may be configured such that, when the ejector plate is moved to a predetermined position, the first member is connected with a movable-side receiving plate and is kept at that position.

In the ejection mechanism of the molding die assembly, the molding die assembly may include an undercut processing mechanism, and the first member may be an ejector pin configured to push out the undercut processing mechanism.

In the ejection mechanism of the molding die assembly, the ejection mechanism may further include one or more ejector pins fixed to the ejector plate or include a plurality of the retaining units assembled with the ejector plate to enable multi-stage ejection.

The present invention provides a fixed-side die and/or a movable-side die including the above-described ejection mechanism of the molding die assembly of the present invention.

The present invention provides a molding die assembly including the above-described fixed-side die and/or the movable-side die.

The present invention provides a molded article molded by the fixed-side die and/or the movable-side die, or by the molding die assembly.

According to the present invention, since the retaining mechanism is configured to constitute a unit, the retaining mechanism is easily assembled to a die assembly and has high usability. In addition, the retaining unit of the present invention is configured such that the pressing element for engaging the first member with the second member is detachable and the pressing force thereof is adjustable in a state in which the pressing element is assembled with the second member. Therefore, the retaining unit can be used as a component of various die assemblies and the like, and thus has high versatility. In addition, in the ejection mechanism of the molding die assembly, the recess is provided to the ejector plate, and the second member of the retaining unit is attached to the recess, whereby the molding die assembly and the ejection mechanism of the molding die assembly can be made compact.

As described above, according to the present invention, it is possible to provide a retaining unit that can be easily assembled in a die assembly and has high versatility, a retaining unit that can be compactly assembled with a die, an ejection mechanism of a molding die assembly including the retaining unit, a fixed-side die, a movable-side die, and a molding die assembly.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DESCRIPTION OF EMBODIMENTS

A description of example embodiments follows.

Figure 1:
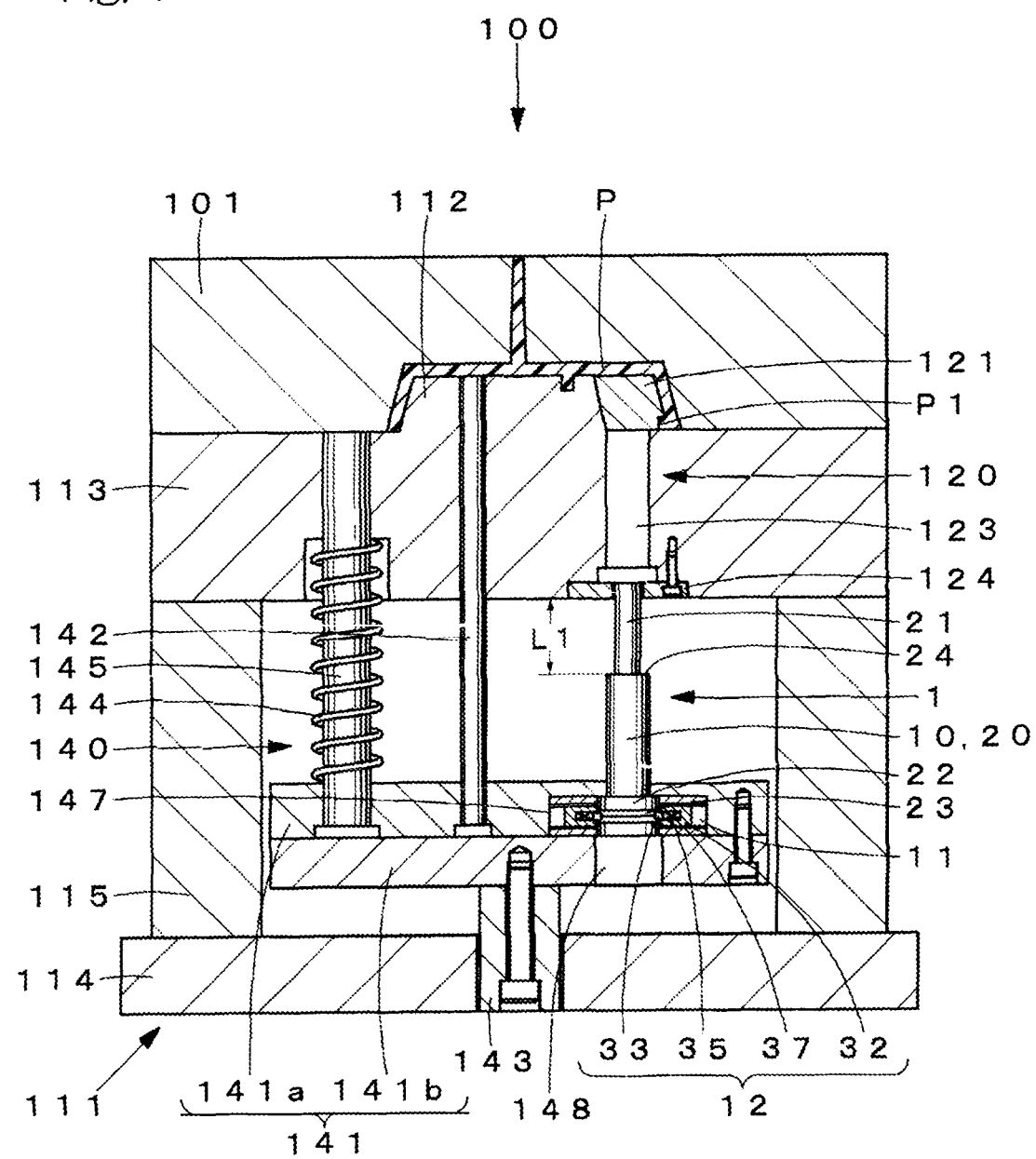
FIG. 1 is a sectional view of a main part of an injection molding die 100 including a retaining unit 1 according to a first embodiment of the present invention, at the time of die clamping.
Figure 2:
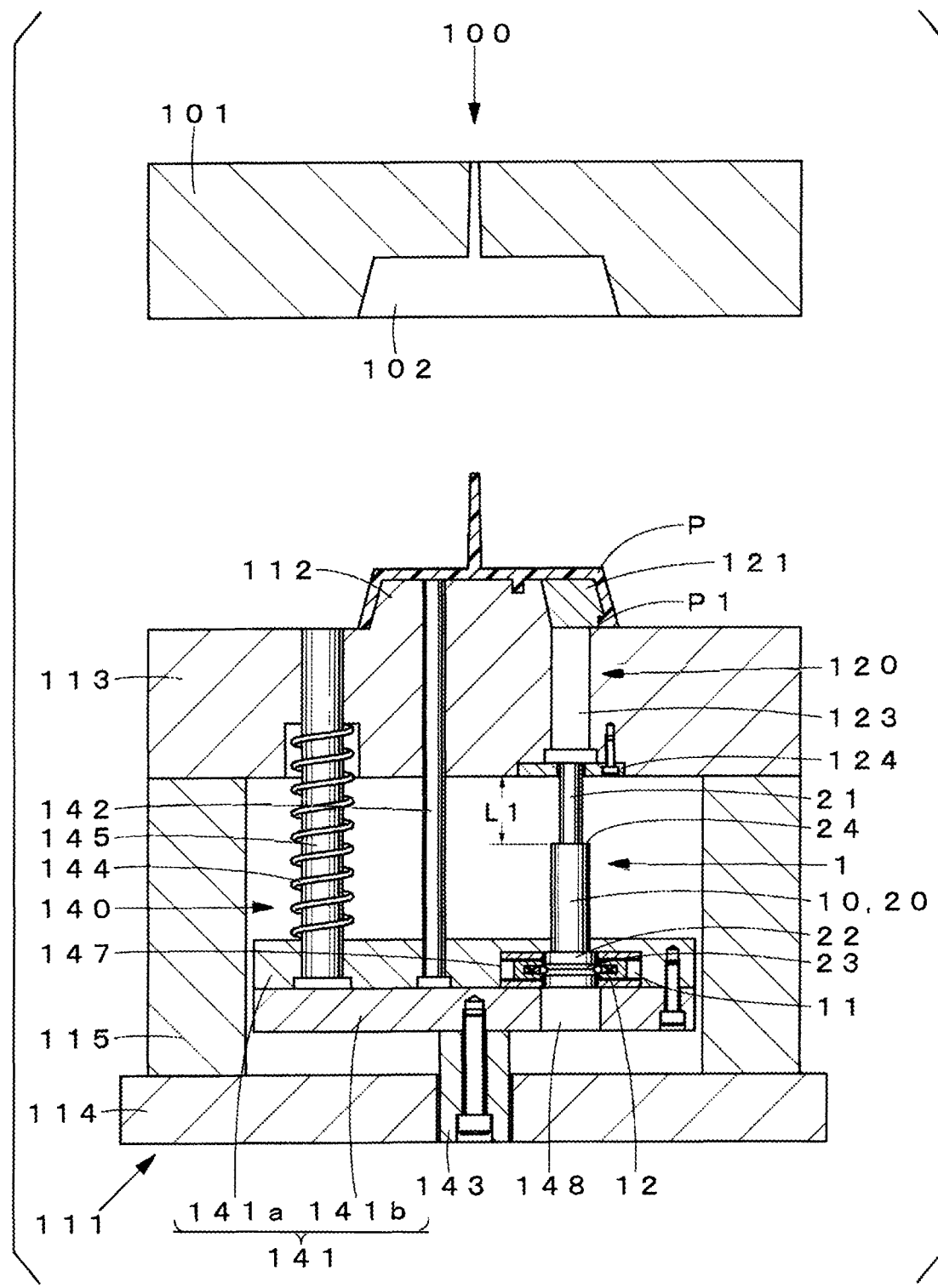
FIG. 2 is a sectional view of a main part of the injection molding die 100 shown in FIG. 1 after die opening.
Figure 3:
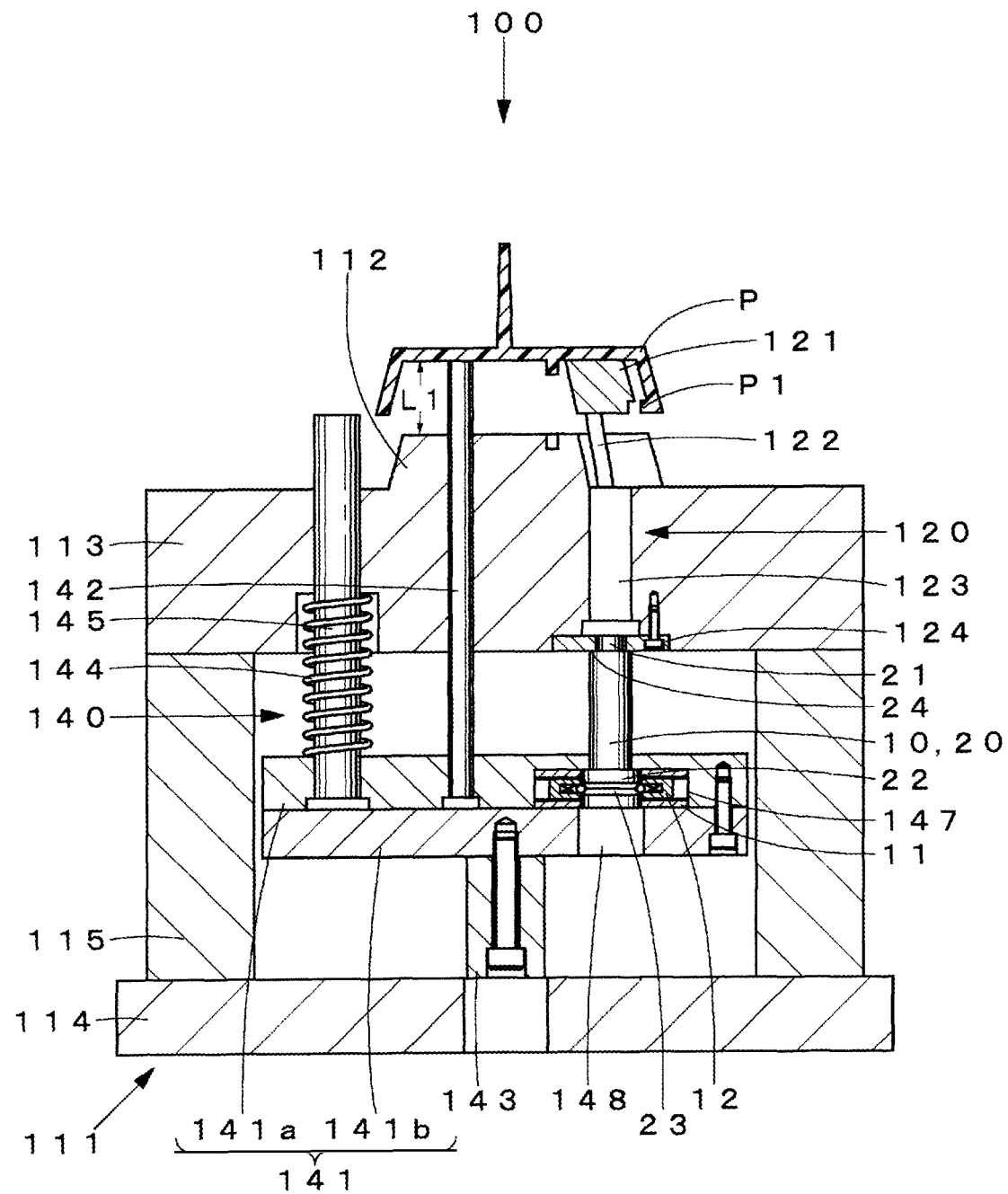
FIG. 3 is a sectional view of a main part of the injection molding die 100 shown in FIG. 1 after ejection operation in a first stage.
Figure 4:
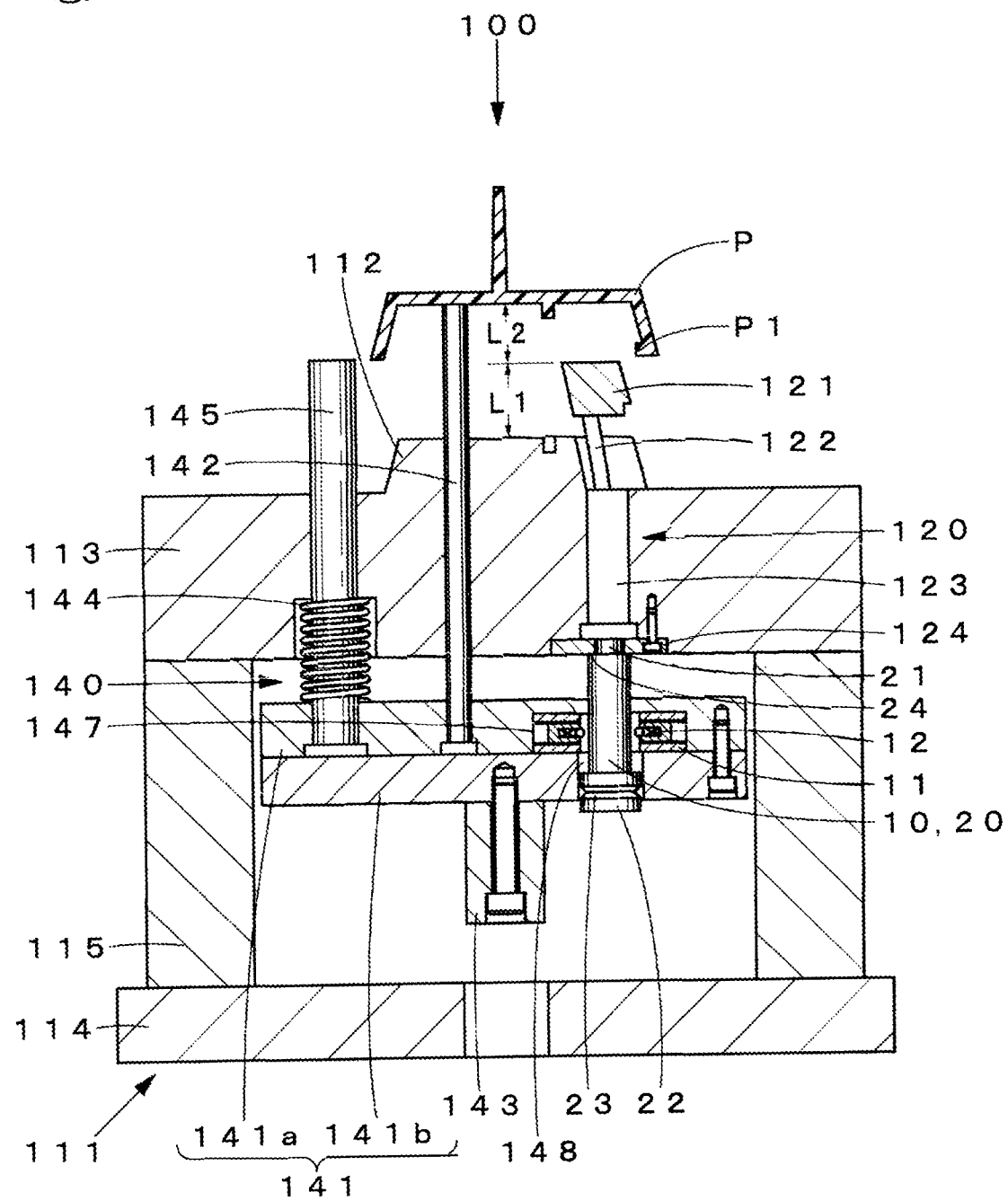
FIG. 4 is a sectional view of a main part of the injection molding die 100 shown in FIG. 1 after ejection operation in a second stage.
Figure 5A:
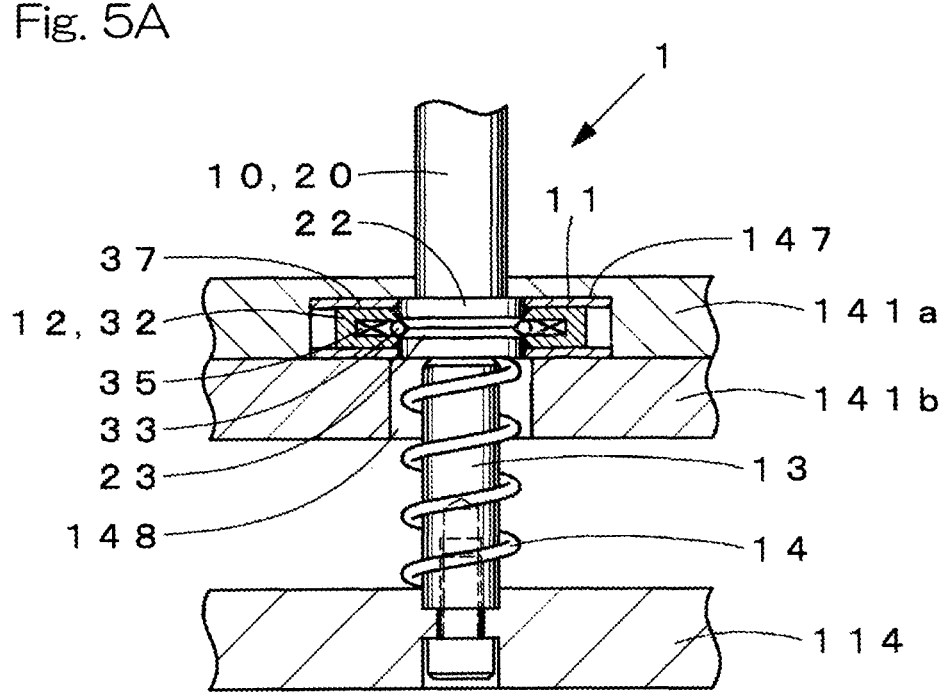
FIGS. 5A and 5B are sectional views of a main part of the injection molding die 100 shown in FIG. 1, in which a stopper 13 for the retaining unit 1 is added.
Figure 5B:
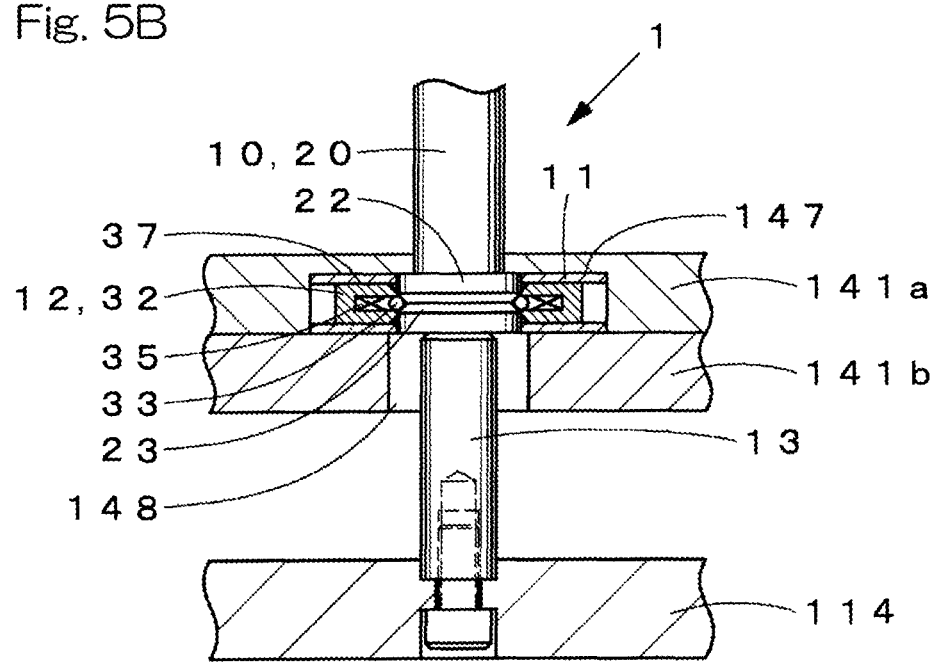

FIG. 1 is a sectional view of a main part of an injection molding die (injection molding die assembly) 100 including a retaining unit 1 according to a first embodiment of the present invention, at the time of die clamping. FIG. 2 is a sectional view of a main part of the injection molding die 100 shown in FIG. 1 after die opening. FIG. 3 is a sectional view of a main part of the injection molding die 100 shown in FIG. 1 after ejection operation in a first stage. FIG. 4 is a sectional view of a main part of the injection molding die 100 shown in FIG. 1 after ejection operation in a second stage. FIG. 5A and FIG. 5B are sectional views of a main part of the injection molding die 100 shown in FIG. 1, in which a stopper 13 for the retaining unit 1 is added. In FIG. 3 and FIG. 4, a fixed-side die 101 is not shown.

The injection molding die 100 includes the fixed-side die 101 having a cavity 102 forming a molding surface, and a movable-side die (die assembly) 111 having a core 112 forming a molding surface, and molds a molded article P. A retaining unit 1 according to the first embodiment of the present invention is assembled in the movable-side die 111 of the injection molding die 100, and enables two-stage ejection in ejection operation of the molded article P.

The retaining unit 1 includes: an ejector pin 10 which is a movable first member; a ring-shaped member 11 which is a second member used in an unmovable fixed state relative to an ejector plate 141 mentioned below; and ball plungers 12 which are pressing element attached to the ring-shaped member 11 and configured to press a part of the ejector pin 10 to engage the ejector pin 10 with the ring-shaped member 11. The ejector pin 10 is configured to be attachable and detachable with respect to the ring-shaped member 11 via the ball plungers 12.

The movable-side die 111 includes: a movable-side receiving plate 113 having a core 112 formed thereon; a movable-side attachment plate 114 for attaching the movable-side die 111 to a die plate (not shown) on the side of die-clamping-mechanism of an injection molding machine; and a spacer block 115 placed between the movable-side receiving plate 113 and the movable-side attachment plate 114, to ensure a movable area for the ejection mechanism 140.

The movable-side die 111 further includes an undercut processing mechanism 120. Here, an undercut P1 is an inner undercut. The undercut processing mechanism 120 includes: a molding piece 121 for molding the undercut P1; an undercut molding unit 123 which has an inclined pin 122 (FIG. 3) and moves the molding piece 121 in a direction perpendicular to the ejection direction; and a fixed plate 124 that is made of a magnet to fix the undercut molding unit 123 to the movable-side receiving plate 113. The distal end of the ejector pin 10 (the first member of the retaining unit 1) is connected and fixed to the proximal end (base end) of the undercut molding unit 123.

The movable-side die 111 further includes an ejection mechanism 140 for ejecting the molded article P and the molding piece 121. The ejection mechanism 140 includes an ejector plate 141 and an ejector pin 142 which is fixed to the ejector plate 141 and ejects the molded article P. An ejector rod 143 is fastened to the ejector plate 141 with a bolt. The ejector rod 143 transmits power for ejection applied via an ejection mechanism (not shown) of the injection molding machine to the ejector plate 141. In addition, a return pin 145 is fixed to the ejector plate 141. The return pin 145 is inserted through a compression coil spring 144 which returns the ejector plate 141 to a position before the ejection.

The ejector plate 141 is constituted of an upper ejector plate 141a and a lower ejector plate 141b which are fastened with a bolt to form one ejector plate. The ejector plate 141 has a counterbored plate structure, and sandwiches the flanges of the bottom portions of the return pin 145 and the ejector pin 142 for ejecting the molded article P, thereby fixing them, and sandwiches the ring-shaped member 11 of the retaining unit 1 so as to be fitted into a recess 147 formed in the upper ejector plate 141a, thereby fixing the ring-shaped member 11. The lower ejector plate 141b has an insertion hole 148 penetrating therethrough so as to allow an enlarged portion 22 of the ejector pin 10 described later to be inserted therethrough.

The ejector pin 10 is the movable first member of the retaining unit 1 and is used for ejecting the molding piece 121. Unlike the ejector pin 142 which directly ejects the molded article P, the ejector pin 10 is detachably connected with the ejector plate 141 via the ball plungers 12 assembled to the ring-shaped member 11 fixed in an unmovable state to the ejector plate 141. An attachment/detachment mechanism for the ejector pin 10 and the ejector plate 141 via the ball plungers 12 will be described.

The ejector pin 10 is a straight-type stepped pin and is formed such that a distal end portion 21 is thinner than a body portion 20 at a center, and the ejector pin 10 has, at the proximal end thereof, an enlarged portion 22 which is larger than the body portion 20. The ejector pin 10 is configured such that the distal end portion 21 is fixed to the proximal end of the undercut molding unit 123 so as to enable ejection or retraction of the molding piece 121 of the undercut processing mechanism 120, and the enlarged portion 22 is detachably connected with the ring-shaped member 11 via the ball plungers 12.

The outer circumferential surface of the enlarged portion 22 has, over the entire circumference thereof, a recess 23 having a groove shape to which balls 33 provided at the distal ends of the ball plungers 12 as described later are fitted. Owing to the actions of the recess 23 of the enlarged portion 22 and the ball plungers 12, the ejector pin 10 is detachably connected with the ring-shaped member 11, i.e., the ejector plate 141, via the ball plungers 12. It is noted that the recess 23 is not limited to the groove provided over the entire circumference. For example, in the case where rotation of the ejector pin 10 around the center axis is restricted, the recess 23 may be formed as a dent provided at a position corresponding to each ball plunger 12.

The length of the body portion 20 of the ejector pin 10 is set so that the amount of movement (stroke) of the ejector pin 10 becomes a distance L1 required for moving the molding piece 121 to pull out the undercut.

The ring-shaped member 11 has an inner diameter equal to or greater than the outer diameter of the enlarged portion 22 of the ejector pin 10 so as to allow attachment and detachment of the enlarged portion 22 of the ejector pin 10, and four ball plungers 12 which are the pressing element for engaging the ejector pin 10 with the ring-shaped member 11 are assembled with the ring-shaped member 11 so as to be arranged at 90-degree intervals in the circumferential direction, such that the distal ends of the ball plungers 12 are projectable from the inner circumferential surface so as to face toward the center.

Each ball plunger 12 includes: a bottomed and cylindrical body 32; a ball 33 provided in the body 32 so as not to come off from the distal end of the body 32; and a compression coil spring 35 provided in the body 32 and energizing the ball 33 toward the distal end. The balls 33 are fitted into the recess 23 of the enlarged portion 22 of the ejector pin 10, whereby the ejector pin 10 is engaged with the ring-shaped member 11.

The ball plunger 12 has, for example, as a fixing element, a thread formed on an outer circumferential surface 37 of the body 32 so as to be screwed with a female thread portion formed in the radial direction on the ring-shaped member 11, whereby the ball plunger 12 is attachable and detachable with respect to the ring-shaped member 11.

Owing to this configuration, the amount of protrusion of each ball plunger 12 from the inner circumferential surface of the ring-shaped member 11 can be adjusted by the screwing amount. The pressing force of the ball plunger 12 can be adjusted through this adjustment. Further, where the female thread portion of the ring-shaped member 11 is formed as a through hole, it is possible to handle the proximal end side of the ball plunger 12 with an appropriate tool (not shown) via the penetrating female thread portion, even after the ejector pin 10, the ring-shaped member 11, and the ball plungers 12 are assembled to the retaining unit 1. Thus it is possible to adjust the pressing force of each ball plunger 12 through adjustment of the screwing amount. Preferably, loosening of the ball plungers 12 is prevented by a set screw, an adhesive agent, or the like after adjustment of the pressing force.

It is noted that the female thread portion of the ring-shaped member 11 is not limited to a structure in which a female thread is formed in a through hole. For example, a female thread may be formed in a recessed portion provided so as to face the inner circumferential surface of the ring-shaped member 11. In this case, screwing of the ball plunger 12 to the female thread portion and adjustment of the screwing amount thereof may be performed by adjusting the distal end side of the ball plunger 12 (ball 33 side) with an appropriate tool.

The shapes of the ejector pin 10 and the ring-shaped member 11, and the number and the arrangement of the ball plungers 12, are not particularly limited, but may be changed within a range that does not deviate from the gist of the invention. For example, the ejector pin 10 and the ring-shaped member 11 may have polygonal sectional shapes. One to three ball plungers 12 or five or more ball plungers 12 may be assembled to the ring-shaped member 11.

When the enlarged portion 22 of the ejector pin 10 that is attached to the ejector plate 141 in the above described manner is pushed upward (upward in FIG. 1) against the ejector plate 141, the balls 33 of the ball plungers 12 are fitted into the recess 23 of the enlarged portion 22, and the enlarged portion 22 is engaged and connected with the ring-shaped member 11, whereby the ejector pin 10 is fixed to the ejector plate 141. On the other hand, if the ejector pin 10 is pushed downward (downward in FIG. 1) by a force at a certain level or higher, the balls 33 of the ball plungers 12 are detached from the recess 23 of the enlarged portion 22, whereby engagement of the enlarged portion 22 with the ring-shaped member 11 is released, so that the ejector pin 10 can freely move relative to the ejector plate 141.

The force to detach the balls 33 of the ball plungers 12 from the enlarged portion 22 of the ejector pin 10 must be greater than a reaction force caused when the ejector pin 10, with its enlarged portion 22 connected with the ring-shaped member 11, moves the molding piece 121 by ejecting the ejector plate 141. If the force to detach the balls 33 of the ball plungers 12 from the enlarged portion 22 of the ejector pin 10 is smaller than the reaction force when the molding piece 121 is moved, the ejector pin 10 (enlarged portion 22) is detached from the ring-shaped member 11 when the ejector plate 141 is ejected, and thus only the ejector plate 141 moves. As a result, the molding piece 121 cannot be ejected.

In addition, the force to detach the balls 33 of the ball plungers 12 from the enlarged portion 22 of the ejector pin 10 must be smaller than force (power) for ejection applied via an ejection device (not shown) of the injection molding machine. Thus, it is possible to eject the ejector plate 141 in a state in which the ejector plate 141 (ring-shaped member 11) and the ejector pin 10 (enlarged portion 22) are connected with each other, and to release the connection between the ejector plate 141 (ring-shaped member 11) and the ejector pin 10 (enlarged portion 22) when a step portion 24 on the distal end of the body portion 20 of the ejector pin 10 abuts on the fixed plate 124.

In addition, a force required to re-connect the enlarged portion 22 of the ejector pin 10 and the ring-shaped member 11 from the released state by fitting the balls 33 of the ball plungers 12 in the recess 23 of the enlarged portion 22 is set to be smaller than a magnetic attraction force between the step portion 24 of the body portion 20 of the ejector pin 10 and the fixed plate 124. Thus, at the time of die clamping, the ejector pin 10 (enlarged portion 22) is connected with the ring-shaped member 11 before the step portion 24 of the body portion 20 of the ejector pin 10 is detached from the fixed plate 124. Therefore, the ejector pin 10 is prevented from coming into an unconstrained state, and unintended movement of the ejector pin 10 is prevented.

As shown in FIG. 5A and FIG. 5B, a stopper 13 for pushing the bottom surface of the enlarged portion 22 may be provided to the movable-side attachment plate 114 so that the ejector pin 10 (enlarged portion 22) is surely connected with the ring-shaped member 11 when the ejector plate 141 is returned to a die clamping position. Further, a compression coil spring 14 for energizing the ejector pin 10 (enlarged portion 22) toward the distal end side may be attached to the stopper 13 (see FIG. 5A).

Next, operation of the injection molding die 100 at the time of ejection of a molded article, and actions of the ejection mechanism 140 and the retaining unit 1, will be described. The injection molding die 100 undergoes an injection step and a cooling step (see FIG. 1), and then die opening (see FIG. 2), and an ejection step (see FIG. 3, FIG. 4) to eject the molded article P. The movable-side die 111 is retracted via a die clamping device (not shown), whereby die opening is performed, and a space for extracting the molded article P is formed between the fixed-side die 101 and the movable-side die 111. This state is shown in FIG. 2, where the enlarged portion 22 of the ejector pin 10 is engaged with the ring-shaped member 11 fixed to the ejector plate 141, via the ball plungers 12. That is, the ejector pin 10 and the ejector plate 141 are connected with each other via the ring-shaped member 11 and the ball plungers 12.

At the ejection step, an ejector rod 143 advances by receiving power of the ejection device (not shown) of the injection molding machine, and the ejector plate 141 connected with the ejector rod 143 is ejected in an ejection direction (upward in FIG. 3) of the molded article P. Thus, as well as the ejector pin 142 fixed thereto, the ejector pin 10 connected with the ejector plate 141 is moved in the ejection direction, whereby the ejector pin 142 ejects the molded article P and the ejector pin 10 ejects the molding piece 121.

When the ejector plate 141 is ejected by a distance L1, the step portion 24 of the body portion 20 of the ejector pin 10 abuts on the fixed plate 124, whereby movement of the ejector pin 10 is prevented. FIG. 3 shows a state in which the step portion 24 of the body portion 20 of the ejector pin 10 abuts on the fixed plate 124. At this time, the molding piece 121 moves leftward in FIG. 3, and thus the undercut comes off. When the step portion 24 of the body portion 20 of the ejector pin 10 abuts on the fixed plate 124, the ejector pin 10 is attracted to the fixed plate 124 by a magnetic force.

When the step portion 24 of the body portion 20 of the ejector pin 10 abuts on the fixed plate 124, the ejector pin 10 stops moving, but the ejector plate 141 continues advancing. At this time, since the ejection force applied to the ejector plate 141 by the ejection device of the injection molding machine is greater than the force required to detach the ejector pin 10 (enlarged portion 22) from the ring-shaped member 11 (ball plungers 12), connection between the ejector pin 10 and the ejector plate 141 (ring-shaped member 11) is disconnected, and the ejector plate 141 continues advancing while sliding on the outer circumferential surface of the body portion 20 of the ejector pin 10. Although the ejector pin 10 is disconnected from the ejector plate 141, the ejector pin 10 is connected with the movable-side receiving plate 113 by being attracted to the fixed plate 124, and thus stays at that position.

The maximum ejection amount of the ejector plate 141 is a distance of L1+L2 from the original position. The ejector pin 142 fixed to the ejector plate 141 also moves by the distance of L1+L2 from the original position, thereby ejecting the molded article P. FIG. 4 shows a state in which the ejector pin 142 is maximally ejected.

When ejection of the molded article P is finished, a die clamping step is performed. At the die clamping step, the ejection device (not shown) of the injection molding machine is retracted from the side of the movable-side receiving plate 113 to the side of the movable-side attachment plate 114. The ejector plate 141 for which ejection force from the ejection device of the injection molding machine has been lost is retracted from the side of the movable-side receiving plate 113 to the side of the movable-side attachment plate 114 by an elastic force of the compression coil spring 144. At this time, the ejector plate 141 continues retracting while sliding on the outer circumferential surface of the body portion 20 of the ejector pin 10. Just before the ejector plate 141 retracts by the distance L2 from the maximum ejection position, the edge on the distal end of the enlarged portion 22 of the ejector pin 10 comes into contact with the balls 33 of the ball plungers 12 of the ring-shaped member 11, and in this state, the ejector plate 141 further retracts.

Here, the force required for the balls 33 of the ball plungers 12 to be fitted into the recess 23 of the enlarged portion 22 from the state in which the enlarged portion 22 of the ejector pin 10 and the ring-shaped member 11 are detached from each other is set to be smaller than the magnetic attraction force between the step portion 24 of the body portion 20 of the ejector pin 10 and the fixed plate 124. Therefore, when the ejector plate 141 has retracted by the distance L2 from the maximum ejection position, the connection between the step portion 24 of the body portion 20 of the ejector pin 10 and the fixed plate 124 is disconnected after the ejector pin 10 (enlarged portion 22) and the ejector plate 141 (ring-shaped member 11) being connected with each other.

Thereafter, in the state in which the ejector pin 10 (enlarged portion 22) and the ejector plate 141 (ring-shaped member 11) are connected with each other, the ejector plate 141 further retracts, and finally, the distal end of the return pin 145 contacts with the fixed-side die 101, and the ejector plate 141 is pushed back to the original position before ejection.

In the present embodiment, a flange (not shown) may be provided to the step portion 24 of the body portion 20 of the ejector pin 10 for increasing the contact area with the fixed plate 124 and thereby enhancing the attraction force with the fixed plate 124. In the present embodiment, a rubber magnet, a plastic magnet, an electromagnet, or the like can be used as the magnet. This applies also to the embodiments described later. A rubber magnet and a plastic magnet have an advantage of being resistant to shock, though the attraction force thereof is comparatively small.

Instead of the fixed plate 124 which performs attraction by a magnetic force, the retaining unit of the present invention may be used. In this case, for example, instead of the fixed plate 124, the ring-shaped member 11 or an equivalent member may be fixed to the movable-side receiving plate 113, and a recess (not shown) may be formed over the entire circumference of the outer circumferential surface on the distal end side of the body portion 20 of the ejector pin 10 such that the balls 33 of the ball plungers 12 assembled to the ring-shaped member 11 that replace the fixed plate 124 are fitted in the recess.

As described above, according to the present embodiment, since the retaining mechanism is constituted as the retaining unit 1, the retaining mechanism (retaining unit 1) can be easily assembled to the die assembly such as the injection molding die 100 and has high usability. In addition, the retaining unit 1 of the present embodiment is configured such that the ball plungers 12 are attachable/detachable with respect to the ring-shaped member 11, and the pressing force is adjustable in a state in which the ball plungers 12 are assembled with the ring-shaped member 11, where the ball plungers 12 are the pressing element to engage (enlarged portion 22 of) the ejector pin 10 (the first member) with the ring-shaped member 11 (the second member). Therefore, the retaining unit 1 can be used being assembled with various dies and the like, and thus has high versatility. In addition, as in the injection molding die 100 shown in the present embodiment, it is possible to downsize a molding die assembly and an ejection mechanism of a molding die assembly, by providing the recess 147 to the ejector plate 141 of the ejection mechanism, and attaching the second member of the retaining unit 1 to the recess 147.

In addition, in the injection molding die 100 of the present embodiment, the ejector pin 10 the stroke amount of which is mechanically (physically) restricted is connected with the ejector plate 141 via the ball plungers 12 assembled with the ring-shaped member 11, whereby movement of the ejector pin 10 and movement of the ejector plate 141 can be separated from each other, and thus movement of the ejector pin 10 and movement of the ejector plate 141 can be made independent of each other.

In the injection molding die 100 shown in the above embodiment, a single ejector pin 142 is firmly fixed to the ejector plate 141 and a single ejector pin 10 is fixed (attached) to the ejector plate 141 detachably. However, as is obvious from the above configuration, two or more of pins may be mounted for each configuration, and the stroke amounts of the respective ejector pins 10 may be different from each other. Even when the number of the ejector pins 10 fixed detachably is two or more, the number of the ejector plates 141 may be only one. Therefore, even in the case of an injection molding die capable of multi-stage ejection, it is not necessary to enlarge the size of the die.

In addition, in the injection molding die 100 shown in the present embodiment, the ball plungers 12 are used for connecting the ejector pin 10 and the ejector plate 141. Therefore, it is possible to achieve attachment and detachment between the ejector pin 10 and the ejector plate 141 with a simple configuration. Therefore, for the ejection mechanism 140, complicated components are not required, the number of components is small, the structure thereof is simple, and assembly thereof is facilitated. Thus, the ejection mechanism 140 can be manufactured at low cost.

In the above-described embodiment, the stroke amount of the ejector pin 10 is restricted by the step portion 24 of the body portion 20 of the ejector pin 10. However, an element for restricting the stroke amount of the ejector pin 10 is not limited to the above configuration.

Figure 6:
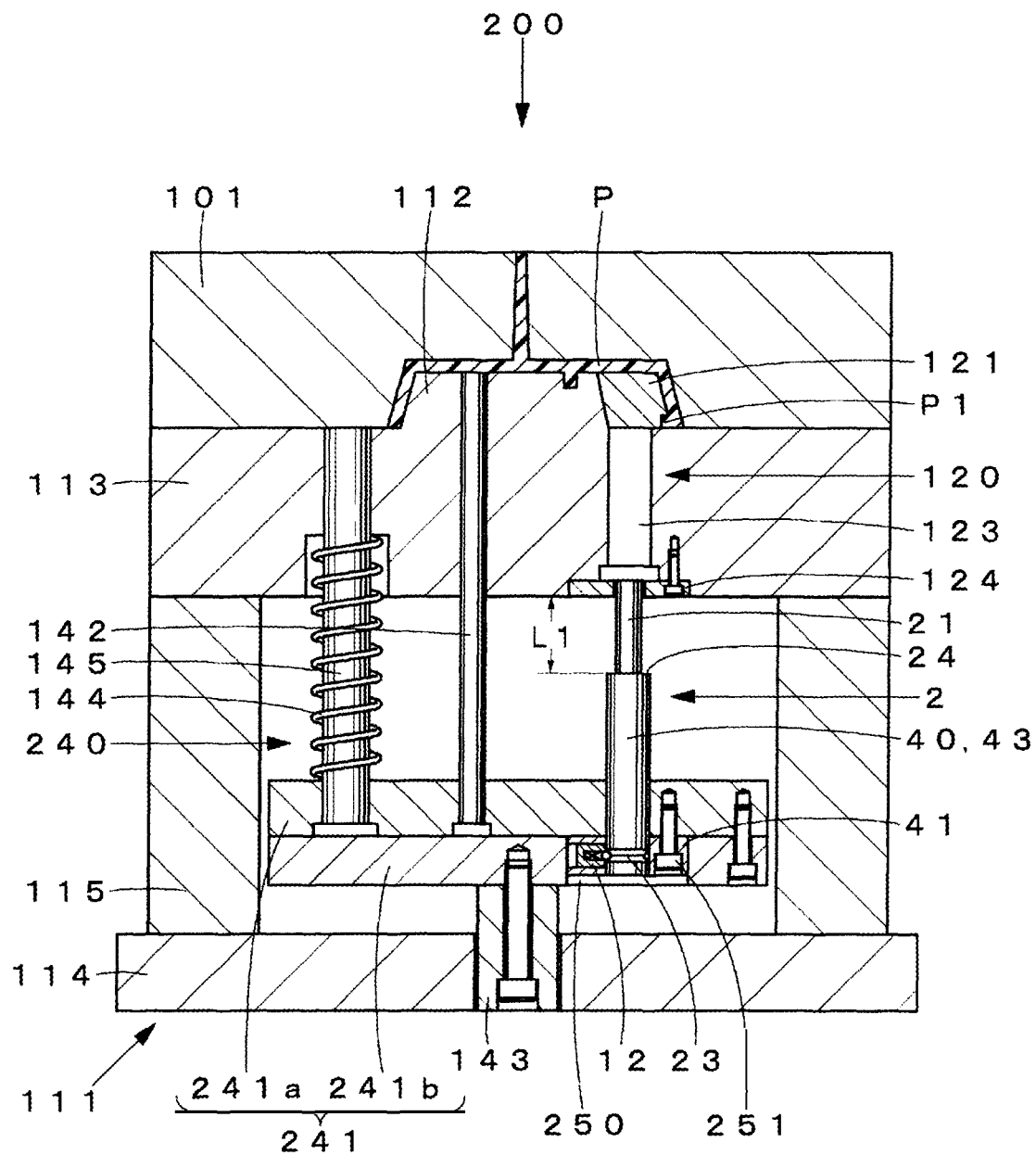
FIG. 6 is a sectional view of a main part of an injection molding die 200 including a retaining unit 2 according to a second embodiment of the present invention, at the time of die clamping.

FIG. 6 is a sectional view of a main part of an injection molding die 200 including a retaining unit 2 according to a second embodiment of the present invention, at the time of die clamping. The same members as those of the injection molding die 100 including the retaining unit 1 in the first embodiment shown in FIG. 1 to FIG. 4 are denoted by the same reference signs, and the description thereof is omitted.

The retaining unit 2 of the present embodiment basically has the same configuration as the retaining unit 1 of the first embodiment, but is different in the manner of attachment to an ejector plate 241. The retaining unit 2 is fixed to an upper ejector plate 241a with a bolt 251 in a state in which a ring-shaped member 41 (second member) is fitted into an attachment hole 250 formed to penetrate through a lower ejector plate 241b of an injection molding die 200.

The retaining unit 2 does not have an enlarged portion at an ejector pin 40. The ejector pin 40 is detachably connected with the ring-shaped member 41 via a recess 23 formed over the entire circumference in the outer circumferential surface at a proximal end portion of a body portion 43, and ball plungers 12 assembled with the ring-shaped member 41. It is noted that the length of the body portion 43 of the ejector pin 40 is set in the same manner as in the first embodiment.

According to the retaining unit 2 of the present embodiment, it is not necessary to disassemble the ejector plate 241 when detaching the retaining unit 2 from the injection molding die 200. Thus, it is possible to easily perform, for example, exchange of the retaining unit 2. Other than the above, basic operation of the injection molding die 200 at the time of ejecting a molded article and basic actions of the ejection mechanism 240 and the retaining unit 2 are the same as in the first embodiment, and therefore the description thereof is omitted.

As shown in the present embodiment, the configuration for attaching the retaining unit of the present invention to the injection molding die is not particularly limited, but any optimum configuration may be adopted as appropriate.

Figure 7:
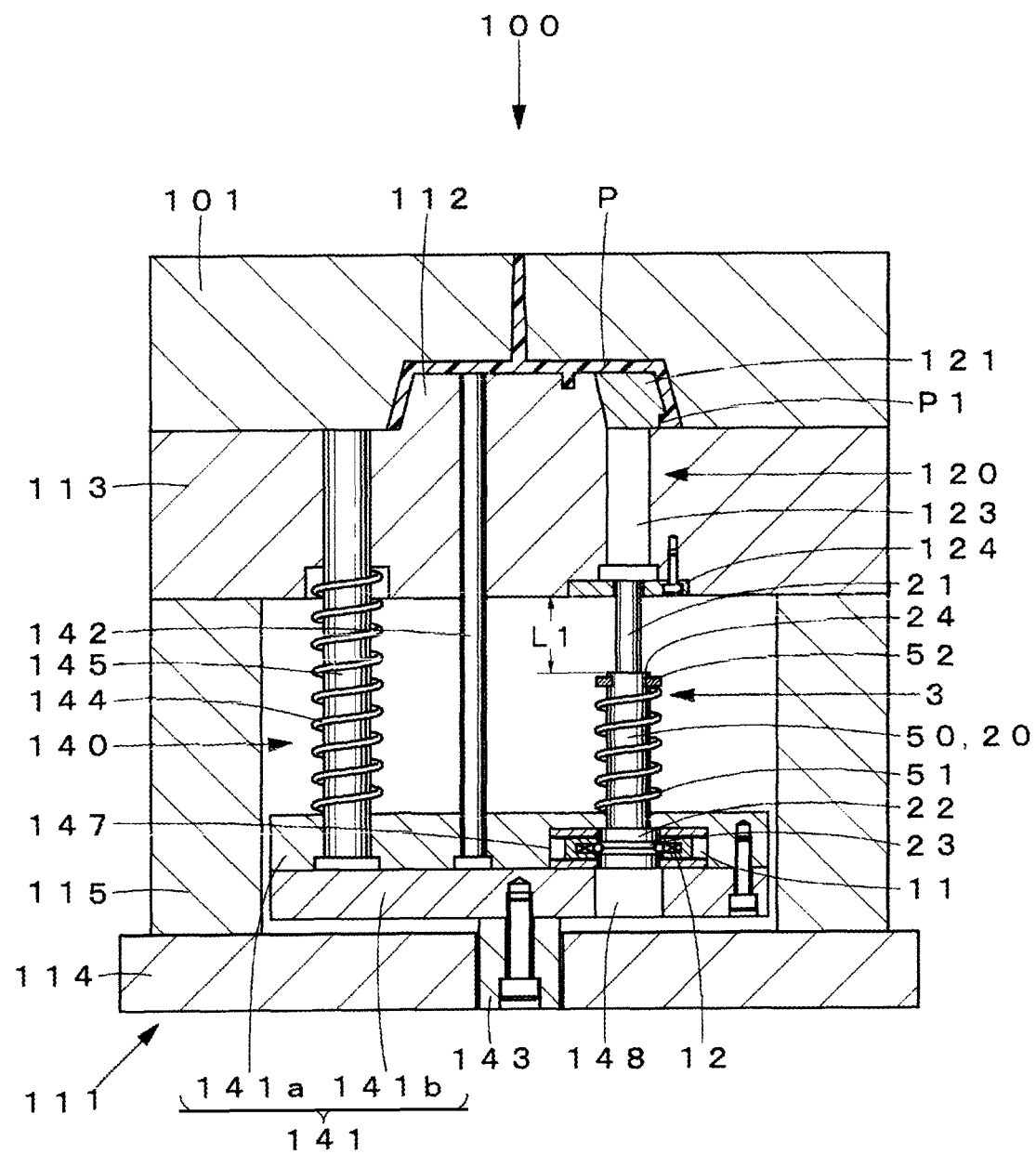
FIG. 7 is a sectional view of a main part of an injection molding die 100 including a retaining unit 3 according to a third embodiment of the present invention, at the time of die clamping.
Figure 8:
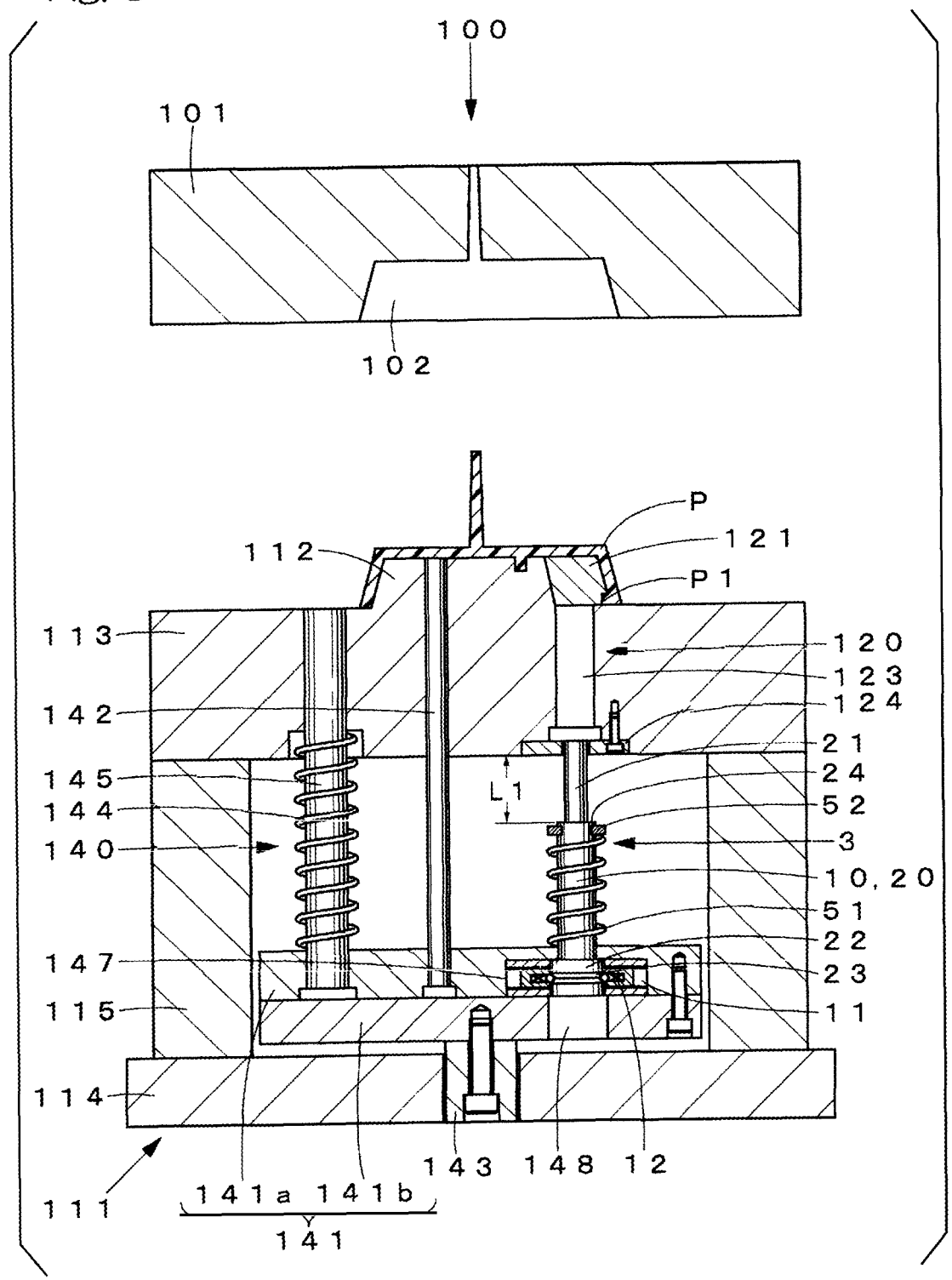
FIG. 8 is a sectional view of a main part of the injection molding die 100 shown in FIG. 7 after die opening.
Figure 9:
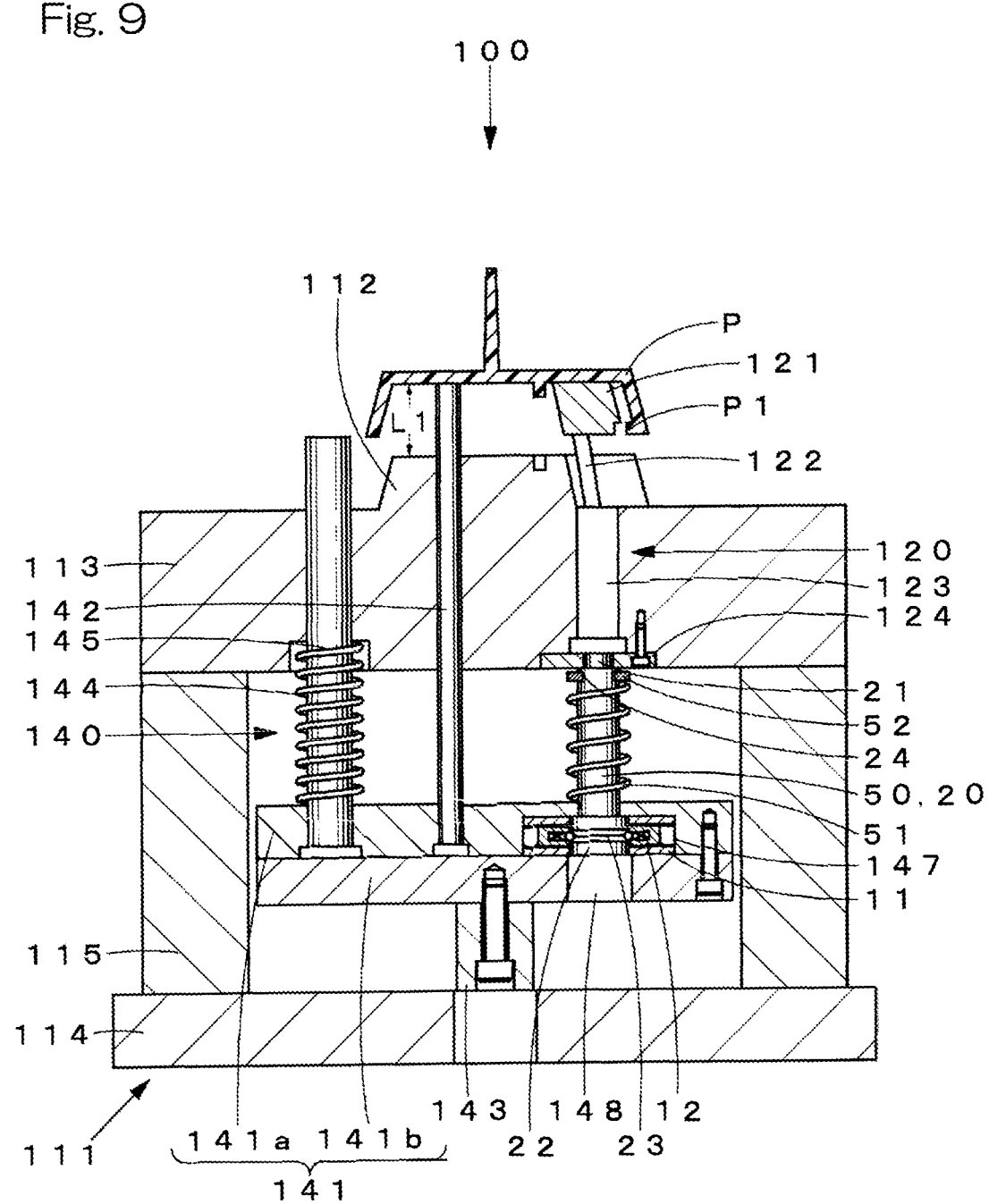
FIG. 9 is a sectional view of a main part of the injection molding die 100 shown in FIG. 7 after ejection operation in a first stage.
Figure 10:
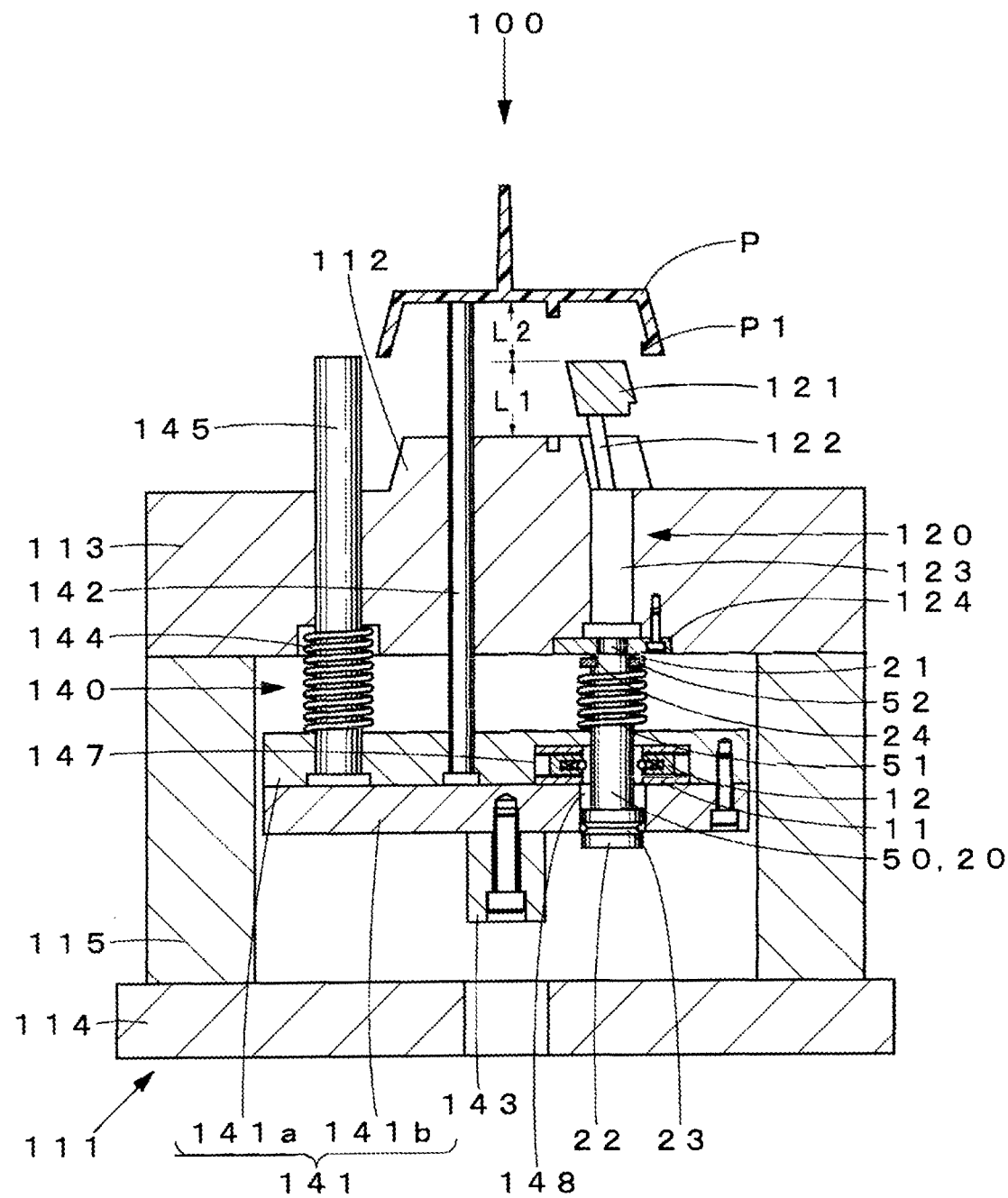
FIG. 10 is a sectional view of a main part of the injection molding die 100 shown in FIG. 7 after ejection operation in a second stage.
Figure 11A:
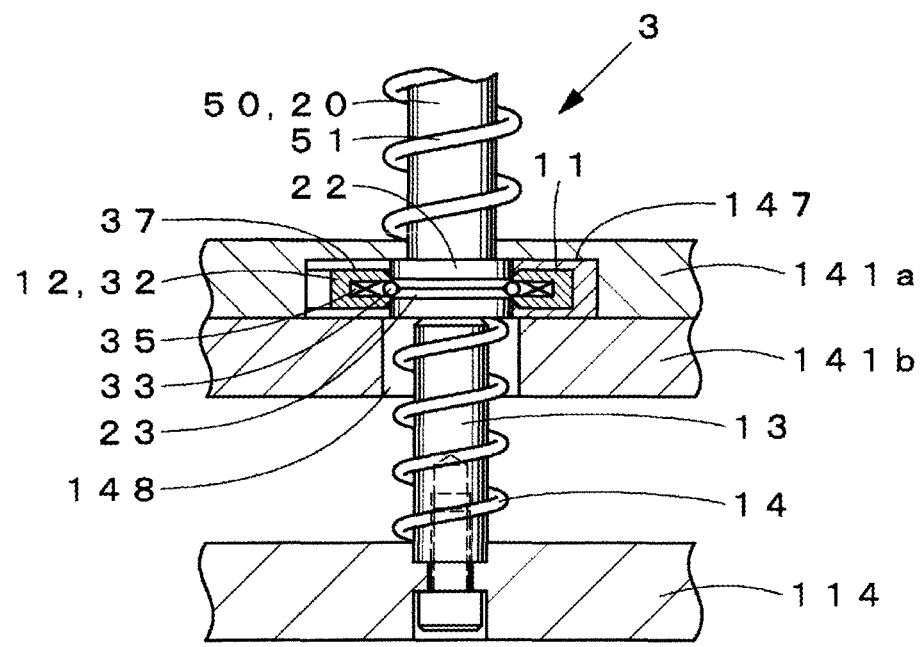
FIGS. 11A and 11B are sectional views of a main part of the injection molding die 100 shown in FIG. 7, where a stopper 13 for the retaining unit 3 is added.
Figure 11B:
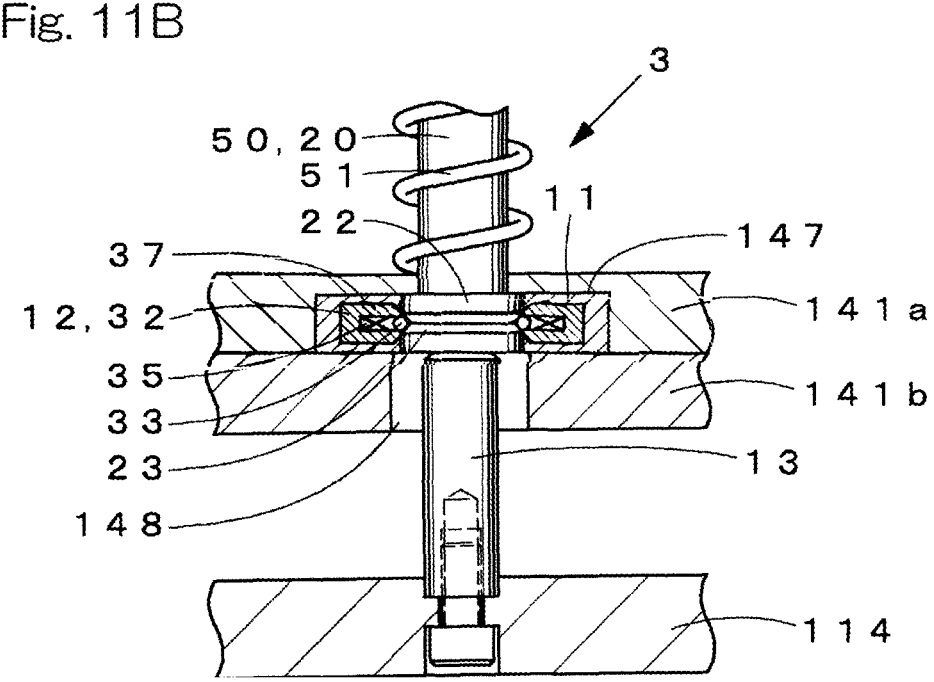

FIG. 7 is a sectional view of a main part of an injection molding die 100 including a retaining unit 3 according to a third embodiment of the present invention, at the time of die clamping. FIG. 8 is a sectional view of a main part of the injection molding die 100 shown in FIG. 7 after die opening. FIG. 9 is a sectional view of a main part of the injection molding die 100 shown in FIG. 7 after ejection operation in a first stage. FIG. 10 is a sectional view of a main part of the injection molding die 100 shown in FIG. 7 after ejection operation in a second stage. FIG. 11A and FIG. 11B are sectional views of a main part of the injection molding die 100 shown in FIG. 7, in which a stopper 13 for the retaining unit 3 is added. In FIG. 9 and FIG. 10, the fixed-side die 101 is not shown. The same members as those of the injection molding die 100 including the retaining unit 1 in the first embodiment shown in FIG. 1 to FIG. 4 are denoted by the same reference signs, and the description thereof is omitted.

The retaining unit 3 of the present embodiment basically has the same configuration as the retaining unit 1 of the first embodiment, but a compression coil spring 51 is attached to a body portion 20 with use of a spring receiver 52, where the compression coil spring 51 is an energizing element for energizing an enlarged portion 22 of an ejector pin 50 in a direction (upward in FIG. 7) to be engaged with the ring-shaped member 11.

The compression coil spring 51 prevents the ejector pin 50 from shaking when the ejector plate 141 is moved, and like as the stopper 13, has a function of pushing the enlarged portion 22 of the ejector pin 50 to the side of the upper ejector plate 141a when the ejector plate 141 returns to a die clamping state, thus surely engaging and connecting the enlarged portion 22 with the ring-shaped member 11.

Other than the above, basic operation of the injection molding die 100 at the time of ejecting a molded article and basic actions of the ejection mechanism 140 and the retaining unit 3 are the same as in the first embodiment, and therefore the description thereof is omitted.

Also in the present embodiment, as in the first embodiment, a stopper 13 may be provided to the movable-side attachment plate 114 so that the enlarged portion 22 of the ejector pin 50 is surely connected with the ring-shaped member 11 when the ejector plate 141 is returned to a die clamping position. Further, a compression coil spring 14 for energizing the enlarged portion 22 of the ejector pin 50 toward the side of the upper ejector plate 141a may be attached to the stopper 13 (see FIG. 11A). Where the stopper 13 is provided, the enlarged portion 22 of the ejector pin 50 is pushed by the distal end of the stopper 13 or the compression coil spring 14 when the ejector plate 141 is returned to the die clamping position, and thus the balls 33 of the ball plungers 12 are surely fitted into the recess 23 of the enlarged portion 22.

In addition, as shown in FIG. 11A, by using two compression coil springs 14, 51, i.e., the compression coil spring 51 attached to the body portion 20 of the ejector pin 50 and the compression coil spring 14 attached to the stopper 13, it is possible to stably maintain the ejection force of the ejector pin 50 throughout a period from the initial stage to the final stage of the ejection step. At the initial stage of the ejection step, the spring reaction force of the compression coil spring 14 in a compressed state on the stopper 13 side can be efficiently utilized. As the ejection step progresses, the compression coil spring 14 on the stopper 13 side extends and the spring reaction force thereof decreases. At this time, the compression coil spring 51 on the body portion 20 side contracts and the spring reaction force thereof increases. Thus, a high ejection force can be maintained also at the final stage of the ejection step. This will be described in detail, in a fourth embodiment below.

Figure 12:
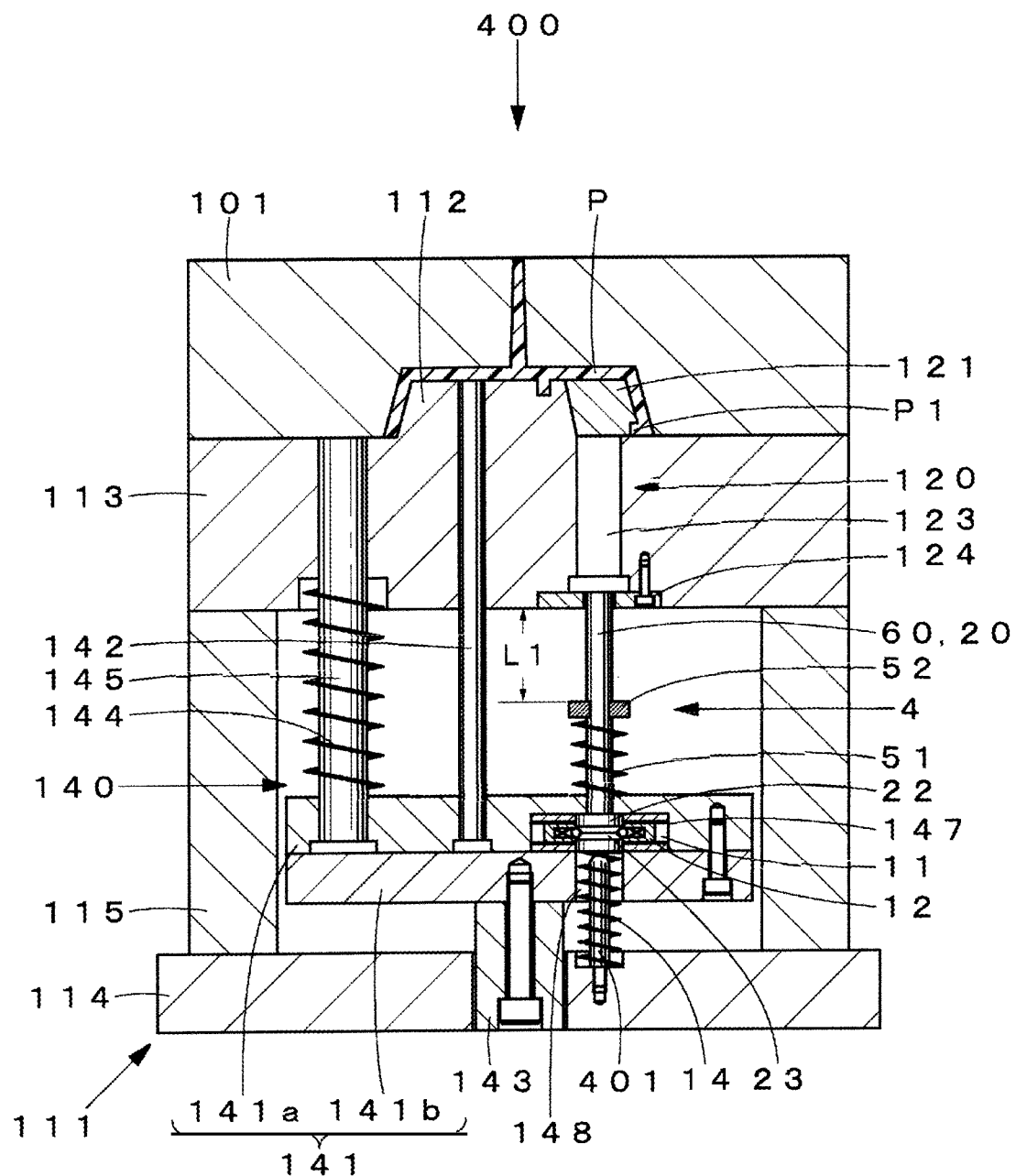
FIG. 12 is a sectional view of a main part of an injection molding die 400 including a retaining unit 4 according to a fourth embodiment of the present invention, at the time of die clamping.
Figure 13:
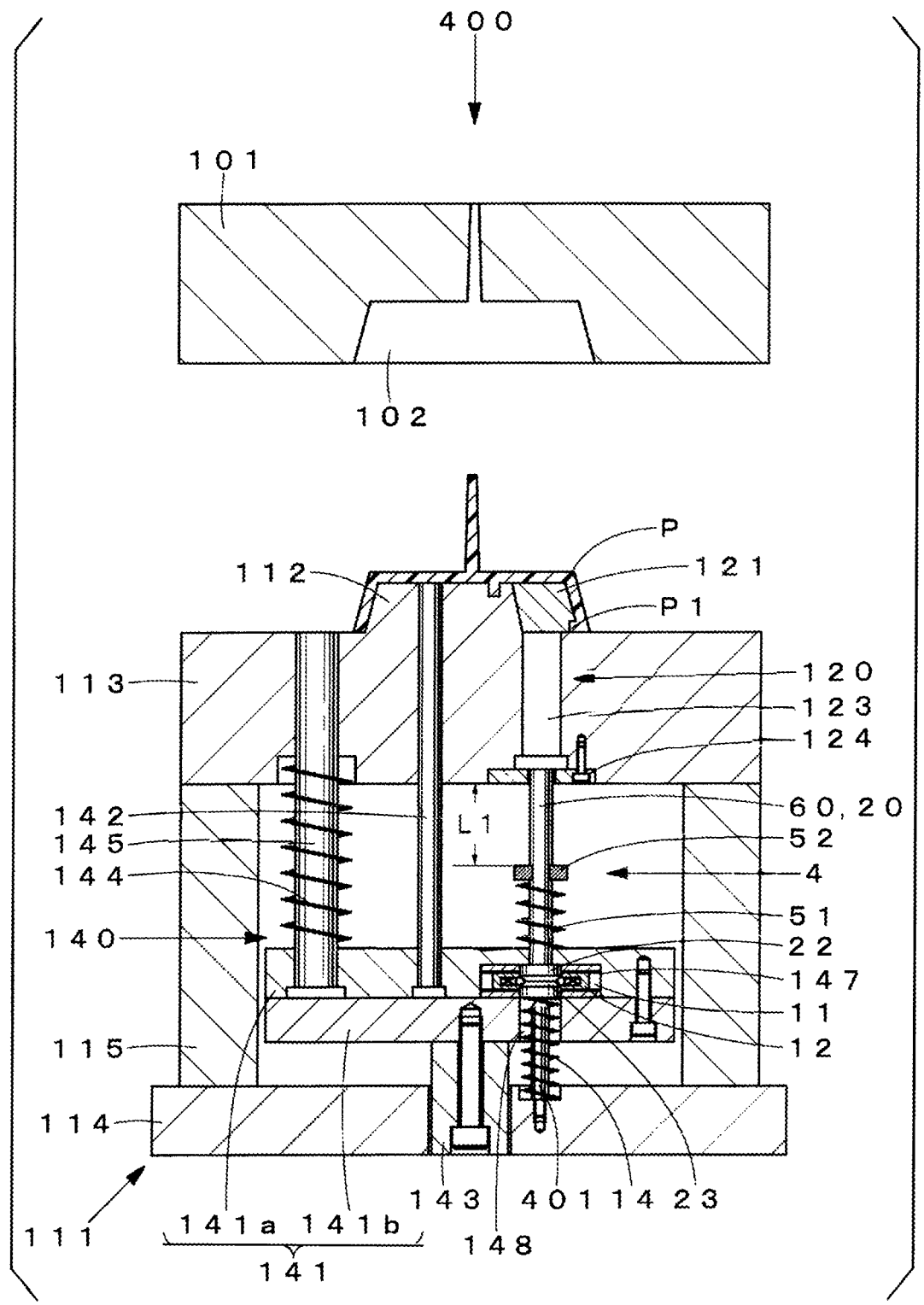
FIG. 13 is a sectional view of a main part of the injection molding die 400 shown in FIG. 12 after die opening.
Figure 14:
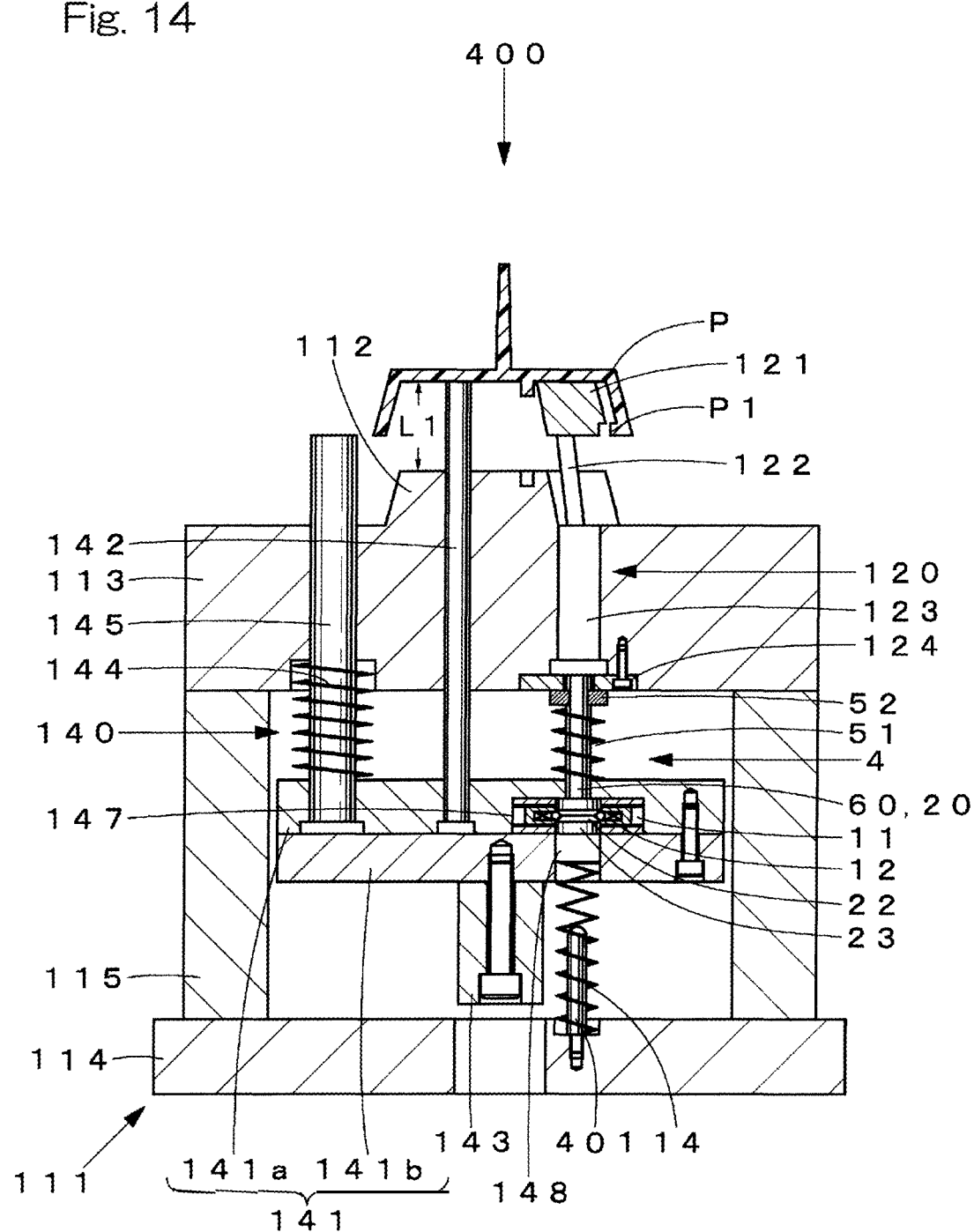
FIG. 14 is a sectional view of a main part of the injection molding die 400 shown in FIG. 12 after ejection operation in a first stage.
Figure 15:
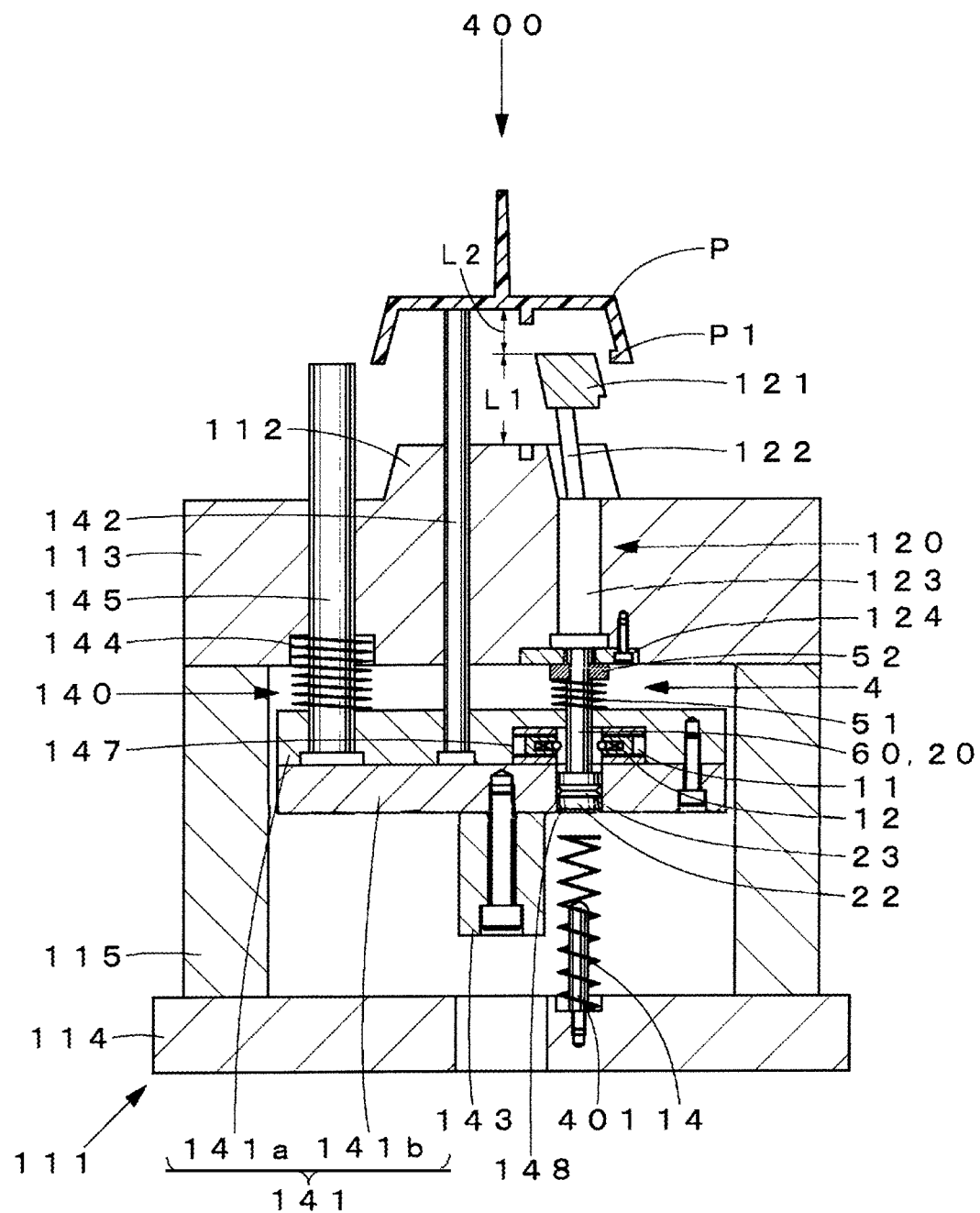
FIG. 15 is a sectional view of a main part of the injection molding die 400 shown in FIG. 12 after ejection operation in a second stage.

FIG. 12 is a sectional view of a main part of an injection molding die 400 including a retaining unit 4 according to the fourth embodiment of the present invention, at the time of die clamping. FIG. 13 is a sectional view of a main part of the injection molding die 400 shown in FIG. 12 after die clamping. FIG. 14 is a sectional view of a main part of the injection molding die 400 shown in FIG. 12 after ejection operation in a first stage. FIG. 15 is a sectional view of a main part of the injection molding die 400 shown in FIG. 12 after ejection operation in a second stage. In FIG. 14 and FIG. 15, the fixed-side die 101 is not shown. The same members as those of the injection molding die 100 including the retaining unit 3 in the third embodiment shown in FIG. 7 to FIG. 10 are denoted by the same reference signs, and the description thereof is omitted.

The retaining unit 4 of the present embodiment is the same as the retaining unit 3 of the third embodiment except that an ejector pin 60 does not have a step portion 24. The retaining unit 4 of the present embodiment performs abutting on the fixed plate 124 and attraction thereto, using a spring receiver 52.

In the injection molding die 400 shown in the present embodiment, as in that shown in FIG. 11A, the compression coil spring 14 is attached to the movable-side attachment plate 114. However, in the injection molding die 400 shown in the present embodiment, a guide pin 401 for the compression coil spring 14 is provided instead of the stopper 13, and the guide pin 401 does not directly push the ejector pin 60.

Operation of the injection molding die 400 including the retaining unit 4 of the present embodiment at the time of ejecting a molded article, and actions of the ejection mechanism 140 and the retaining unit 4, will be described. Hereinafter, for convenience sake, the compression coil spring 51 on the body portion 20 side of the ejector pin 60 is referred to as an upper spring 51, and the compression coil spring 14 on the side of the movable-side attachment plate 114 is referred to as a lower spring 14. The upper spring 51 and the lower spring 14 both act so as to energize the enlarged portion 22 of the retaining unit 4 toward the upper ejector plate 141a (upward in FIG. 12).

In die clamping (from injection step to cooling step), the upper spring 51 is mostly extended among all the steps from the injection step to the ejection step, and the lower spring 14 is mostly contracted among all the steps (see FIG. 12). Therefore, the upper spring 51 energizes the enlarged portion 22 by a comparatively small force, and the lower spring 14 energizes the enlarged portion 22 by a comparatively great force. The same applies also after die opening (see FIG. 13).

At the ejection step, as the ejector plate 141 advances, the lower spring 14 extends and the spring reaction force thereof decreases. When the ejector plate 141 is ejected by a distance L1, the spring receiver 52 of the ejector pin 60 abuts on the fixed plate 124, whereby movement of the ejector pin 60 is prevented (see FIG. 14). At this time, the lower spring 14 is apart from the enlarged portion 22 of the ejector pin 60 and the spring reaction force of the lower spring 14 is zero, but the spring reaction force of the upper spring 51 is maintained.

Thereafter, the movement of the ejector pin 60 is stopped, while the ejector plate 141 continues advancing. Thus, the upper spring 51 is compressed and the spring reaction force thereof increases. When the ejector pin 142 is maximally ejected, the upper spring 51 is contracted most among all the steps, and thus the spring reaction force of the upper spring 51 is maximized (see FIG. 15).

As described above, at the initial stage of the ejection step, the spring reaction force of the lower spring 14 in a compressed state can be efficiently utilized. As the ejection step progresses, the lower spring 14 extends and the spring reaction force thereof decreases. At this time, the upper spring 51 contracts and the spring reaction force thereof increases. Therefore, a high ejection force of the ejector pin 60 can be maintained throughout a period from the initial stage to the final stage of the ejection step.

Figure 16:
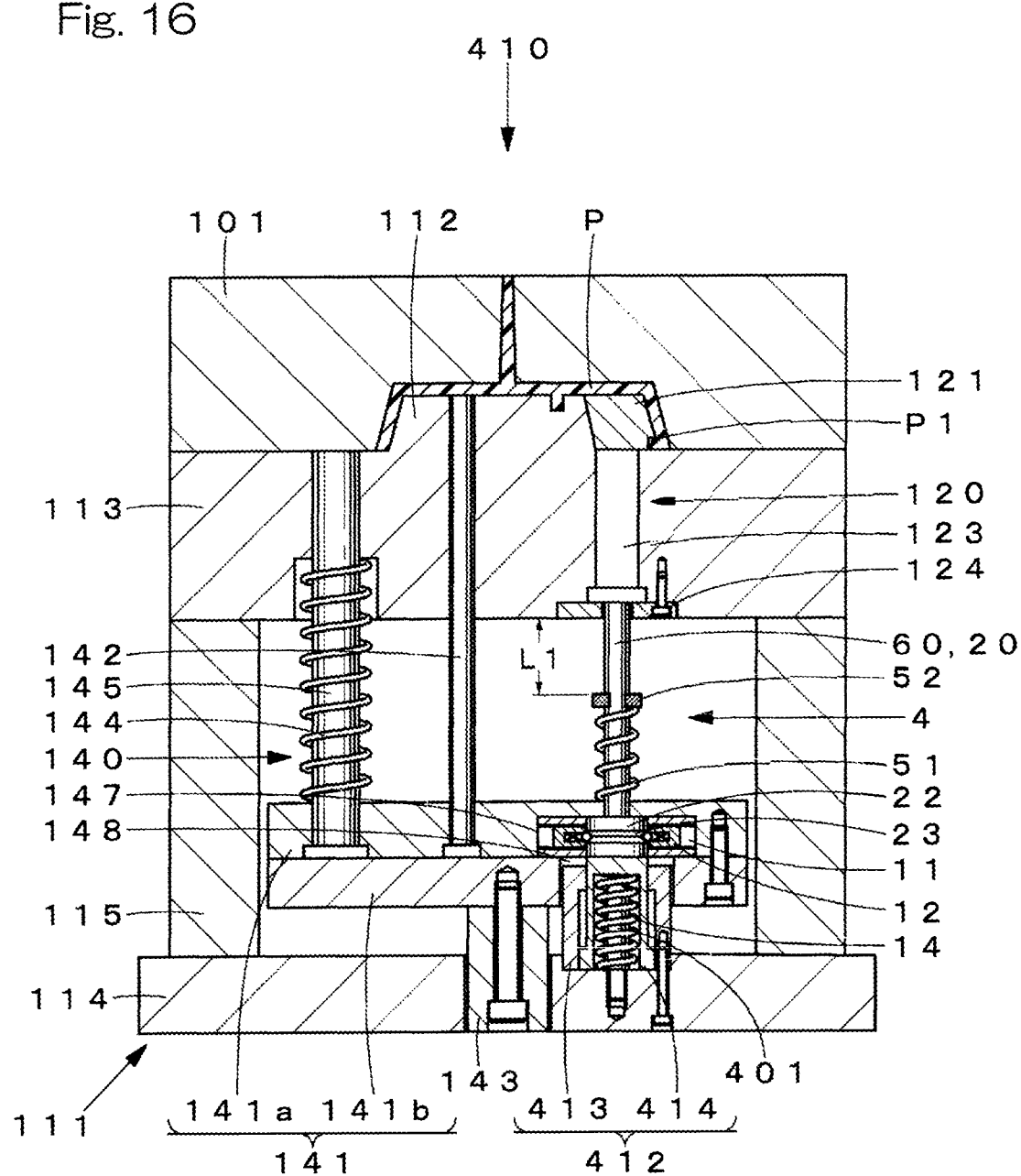
FIG. 16 is a sectional view of a main part of an injection molding die 410 including the retaining unit 4 according to the fourth embodiment of the present invention, at the time of die clamping.
Figure 17:
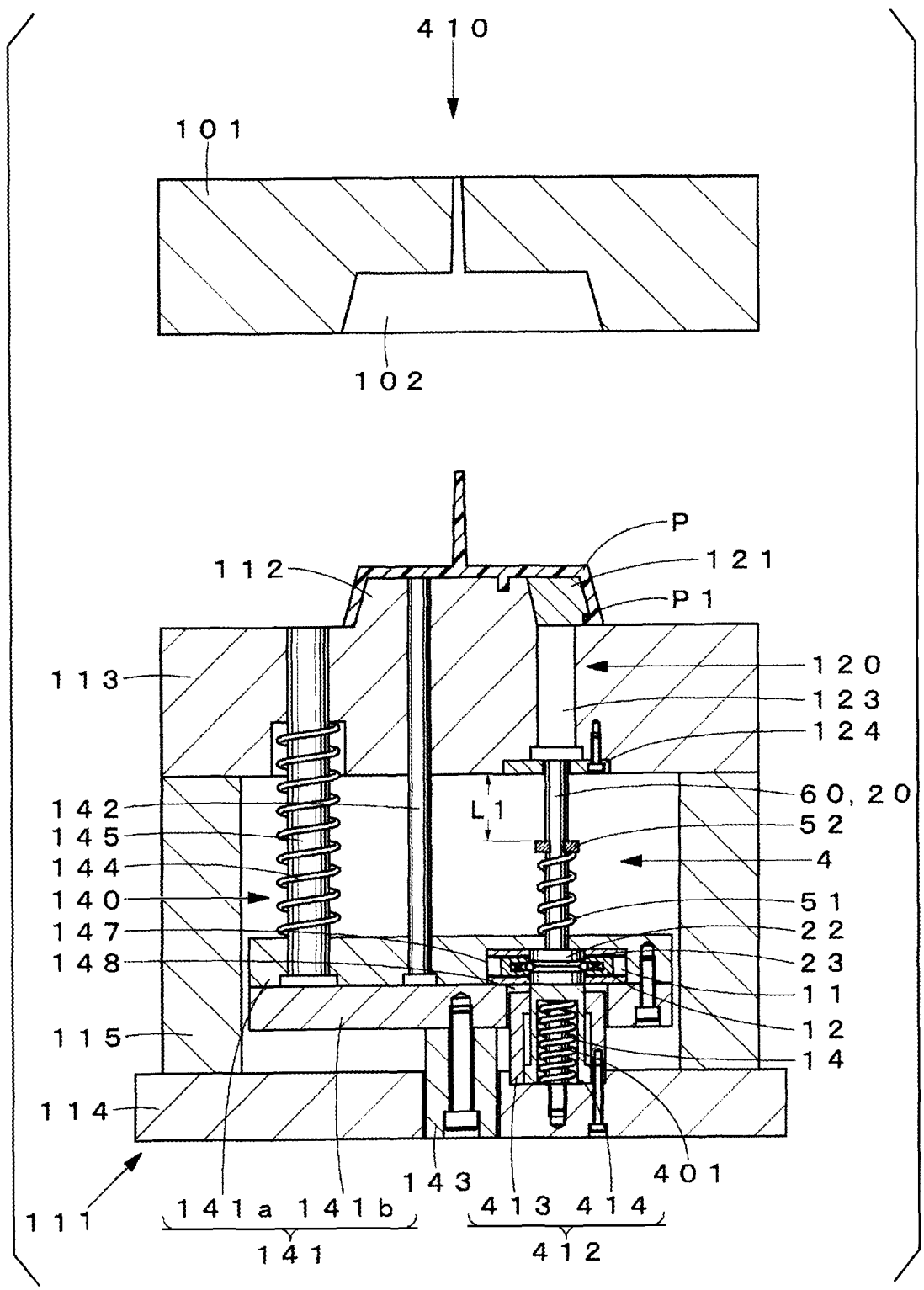
FIG. 17 is a sectional view of a main part of the injection molding die 410 shown in FIG. 16 after die opening.
Figure 18:
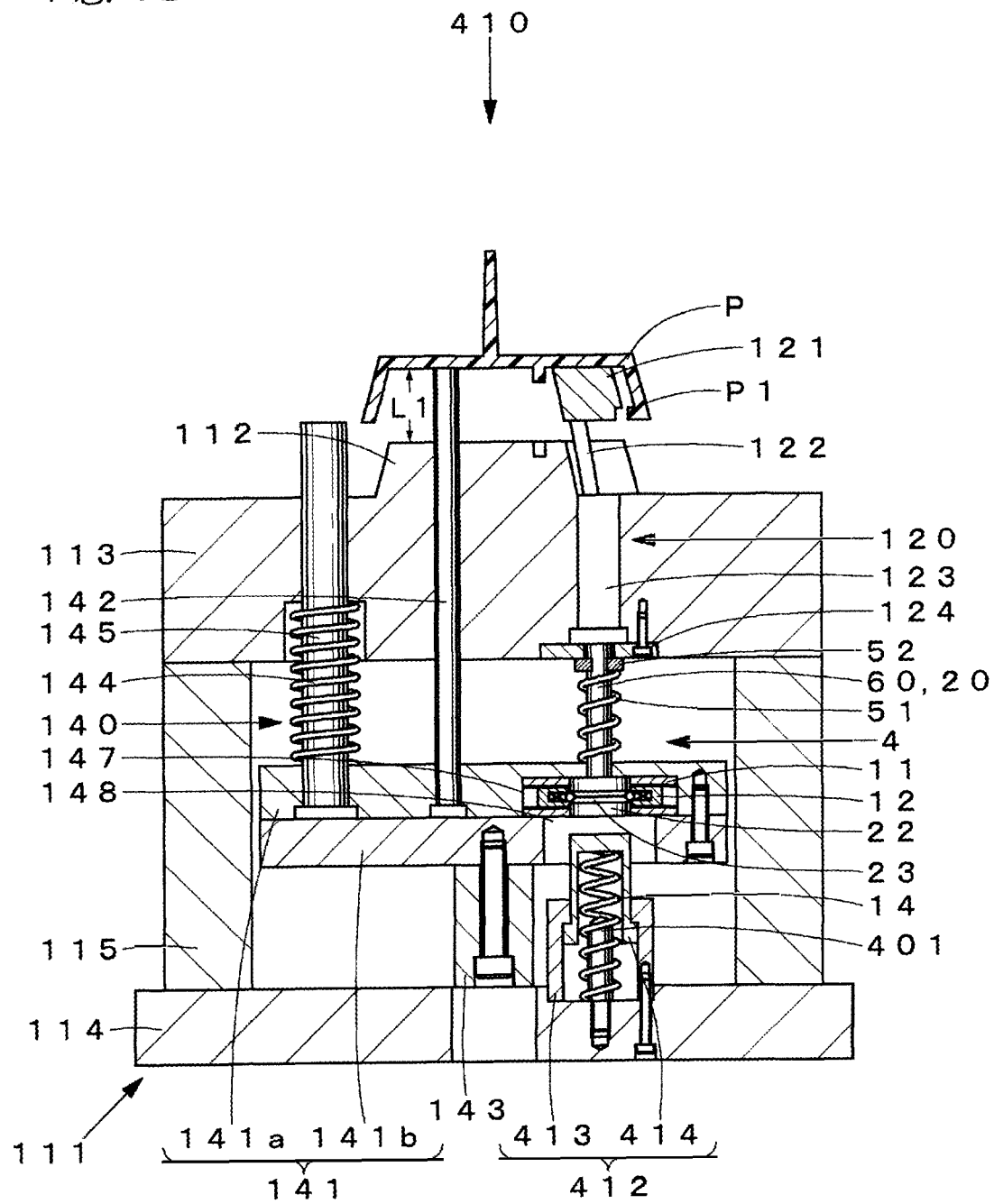
FIG. 18 is a sectional view of a main part of the injection molding die 410 shown in FIG. 16 after ejection operation in a first stage.
Figure 19:
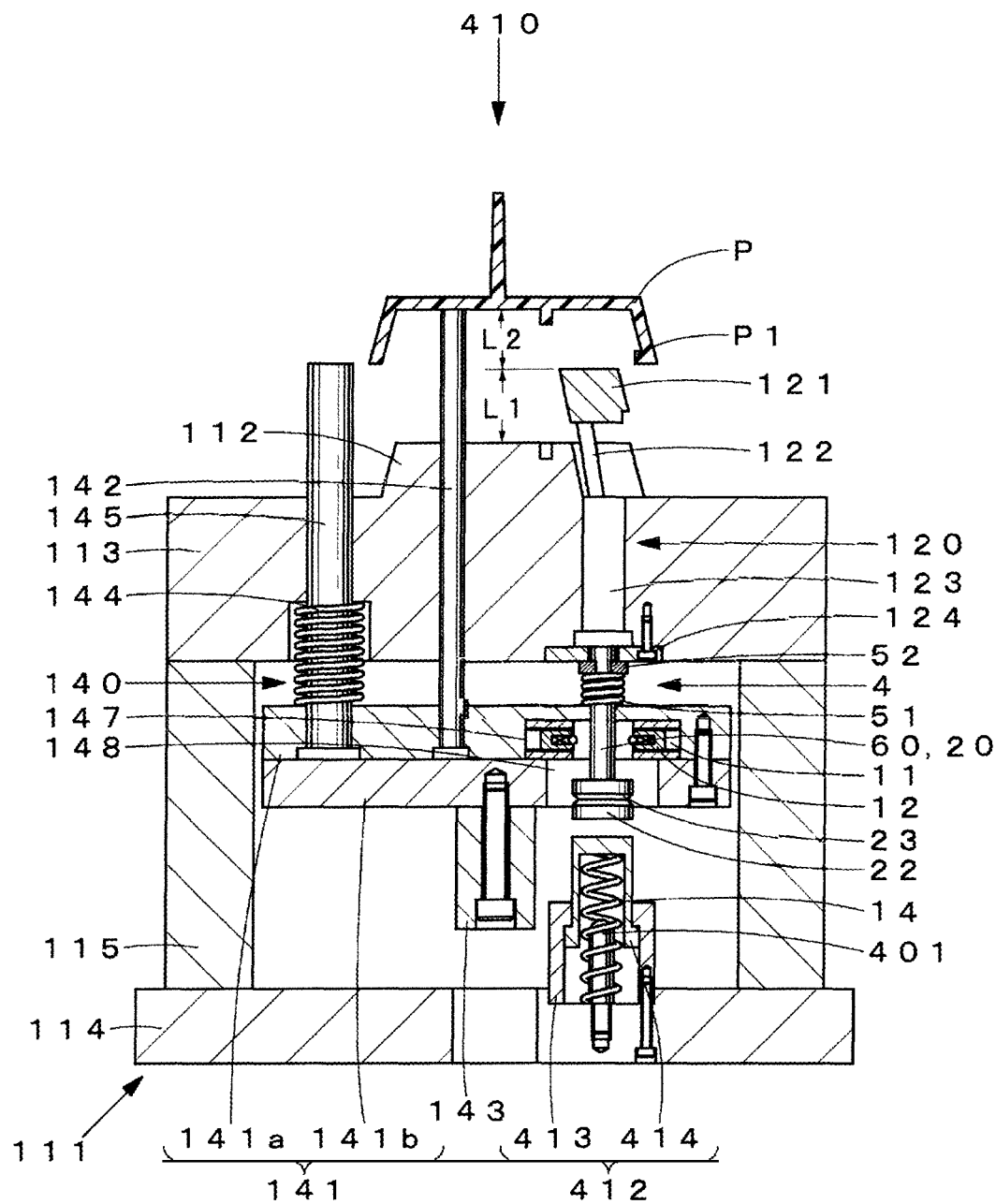
FIG. 19 is a sectional view of a main part of the injection molding die 410 shown in FIG. 16 after ejection operation in a second stage.

FIG. 16 is a sectional view of a main part of an injection molding die 410 including the retaining unit 4 according to the fourth embodiment of the present invention, at the time of die clamping. FIG. 17 is a sectional view of a main part of the injection molding die 410 shown in FIG. 16, after die opening. FIG. 18 is a sectional view of a main part of the injection molding die 410 shown in FIG. 16, after ejection operation in a first stage. FIG. 19 is a sectional view of a main part of the injection molding die 410 shown in FIG. 16, after ejection operation in a second stage. In FIG. 18 and FIG. 19, the fixed-side die 101 is not shown. The same members as those of the injection molding die 400 including the retaining unit 4 in the fourth embodiment shown in FIG. 12 to FIG. 15 are denoted by the same reference signs, and the description thereof is omitted.

The injection molding die 410 shown in the present embodiment has, in addition to the guide pin 401, an extendable and contractible holder 412 that houses the compression coil spring 14. The holder 412 is constituted of a cylindrical outer holder 413 fixed to the movable-side attachment plate 114, and a cylindrical inner holder 414 which has a ceiling portion and which is located inside the outer holder 413 and slidably engaged with the outer holder 413.

Regarding the holder 412, the outer holder 413 is fixed to the movable-side attachment plate 114 with a bolt such that the center axis thereof coincides with the center axis of the ejector pin 60 of the retaining unit 4. The distal end surface of the inner holder 414 contacts with the bottom surface of the enlarged portion 22 of the ejector pin 60, to push the ejector pin 60.

The compression coil spring 14 is housed in an extendable and contractible manner inside the inner holder 414. The ceiling surface of the inner holder 414 and the movable-side attachment plate 114 serve as pressure receiving surfaces against the compression coil spring 14. In the injection molding die shown in the present embodiment, the compression coil spring 14 can be housed in the holder 412, and therefore there is no possibility that the compression coil spring 14 bends or is detached from the guide pin 401 when pushing the bottom surface of the enlarged portion 22.

As shown in FIG. 16 to FIG. 19, basic operations and actions are the same as those of the injection molding die 400 shown in FIG. 12 to FIG. 15, and therefore the description thereof is omitted.

Figure 20:
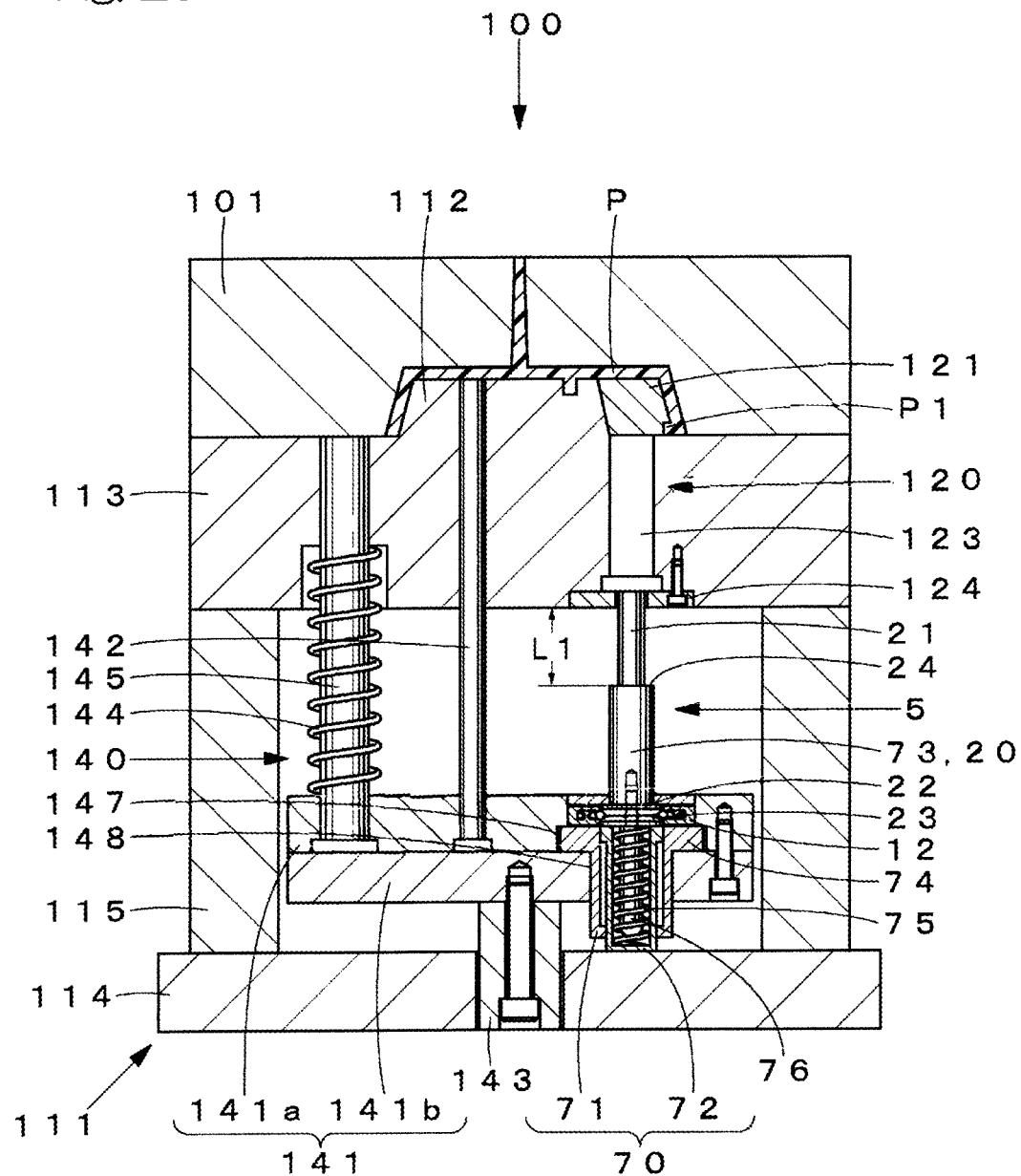
FIG. 20 is a sectional view of a main part of an injection molding die 100 including a retaining unit 5 according to a fifth embodiment of the present invention, at the time of die clamping.
Figure 21:
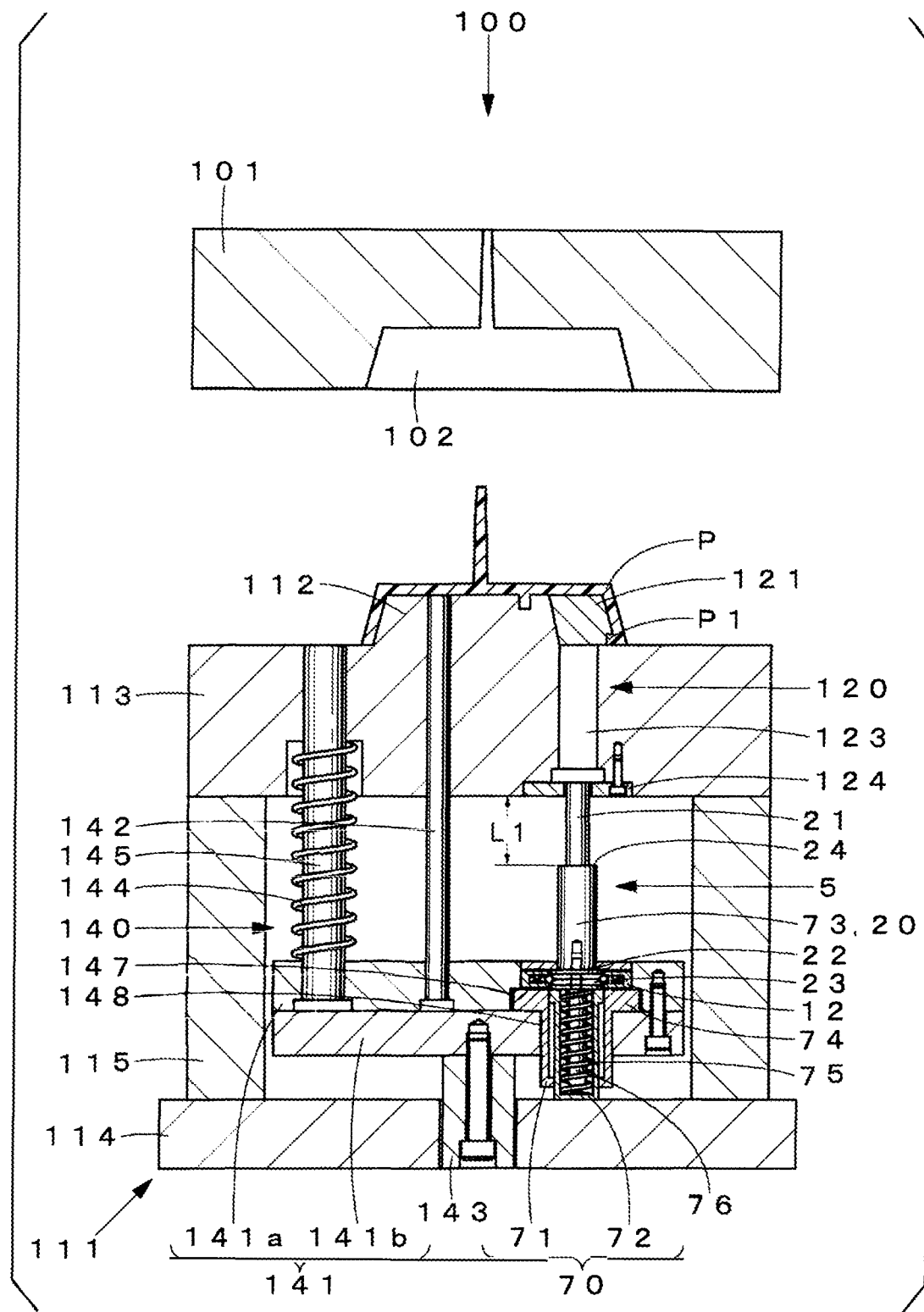
FIG. 21 is a sectional view of a main part of the injection molding die 100 shown in FIG. 20 after die opening.
Figure 22:
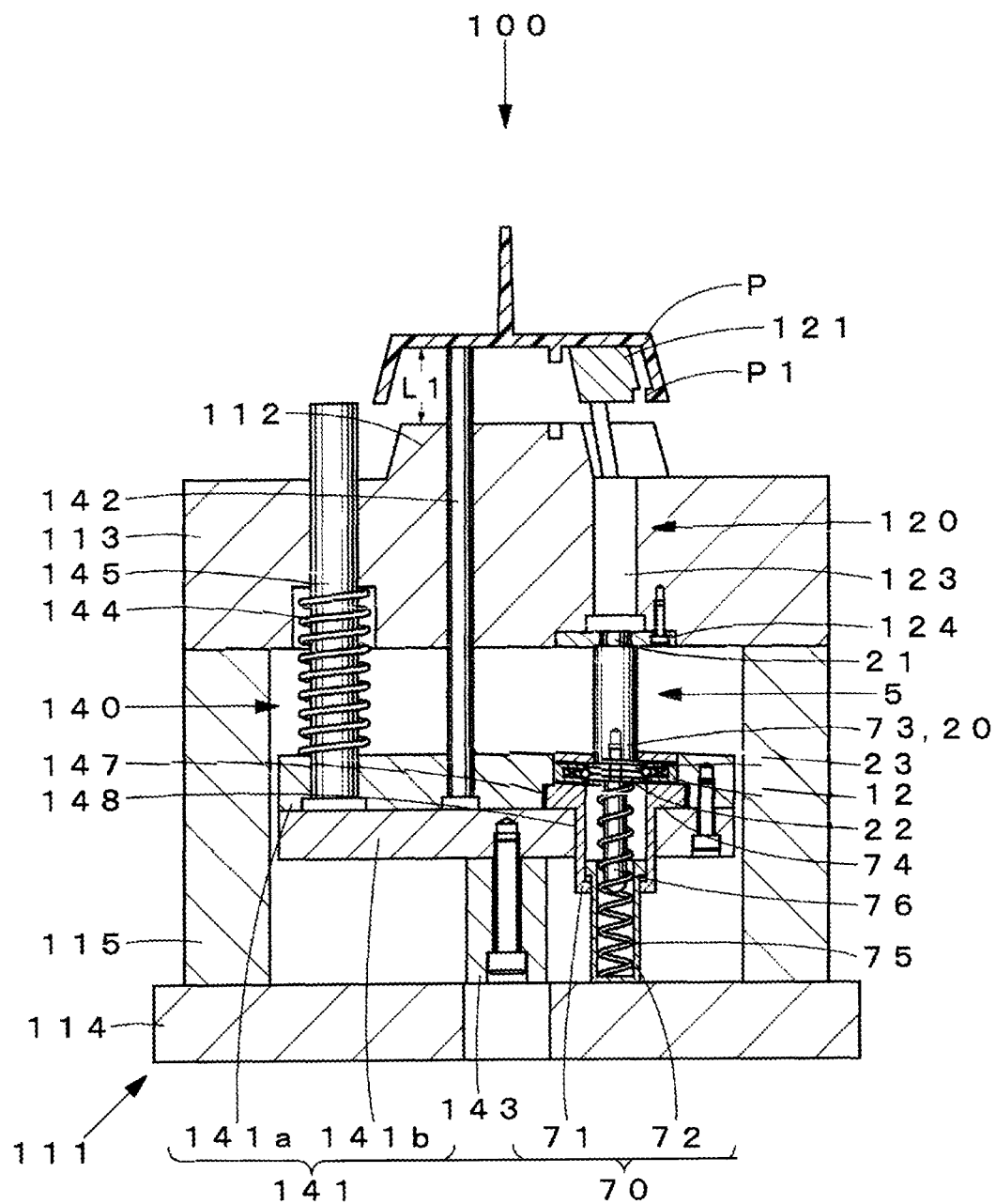
FIG. 22 is a sectional view of a main part of the injection molding die 100 shown in FIG. 20 after ejection operation in a first stage.
Figure 23:
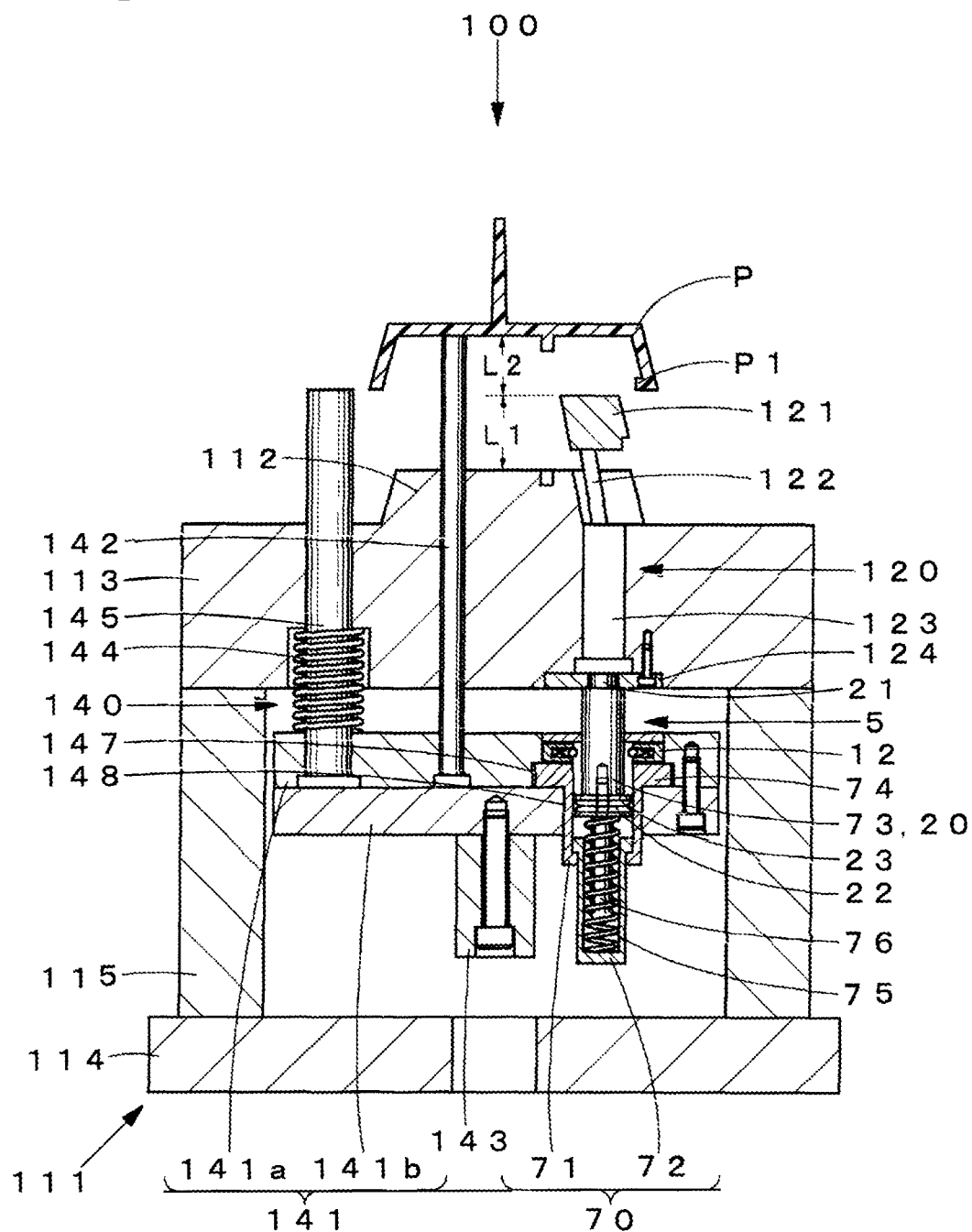
FIG. 23 is a sectional view of a main part of the injection molding die 100 shown in FIG. 20 after ejection operation in a second stage.

FIG. 20 is a sectional view of a main part of an injection molding die 100 including a retaining unit 5 according to a fifth embodiment of the present invention, at the time of die clamping. FIG. 21 is a sectional view of a main part of the injection molding die 100 shown in FIG. 20 after die opening. FIG. 22 is a sectional view of a main part of the injection molding die 100 shown in FIG. 20 after ejection operation in a first stage. FIG. 23 is a sectional view of a main part of the injection molding die 100 shown in FIG. 20 after ejection operation in a second stage. In FIG. 22 and FIG. 23, the fixed-side die 101 is not shown. The same members as those of the injection molding die 100 including the retaining unit 1 in the first embodiment shown in FIG. 1 to FIG. 4 are denoted by the same reference signs, and the description thereof is omitted.

The retaining unit 5 of the present embodiment basically has the same configuration as the retaining unit 1 of the first embodiment, but instead of the ring-shaped member 11, has a holder 70 which has ball plungers 12 and houses a compression coil spring in an extendable and contractible manner, and which functions as a ring-shaped member (the second member). The holder 70 is constituted of a cylindrical outer holder 71 fixed to the ejector plate 141, and a bottomed cylindrical inner holder 72 which is located inside the outer holder 71 and slidably engaged with the outer holder 71.

The holder 70 is attached to the ejector plate 141 via a flange 74 of the outer holder 71 such that the center axis thereof coincides with the center axis of an ejector pin 73 of the retaining unit 5. In the flange 74, as in the ring-shaped member 11 of the retaining unit 1 of the first embodiment, ball plungers 12 are incorporated so as to face inward, and the ejector pin 73 is detachably connected with the holder 70 via the ball plungers 12.

A compression coil spring 75 is housed in the inner holder 72, and the compression coil spring 75 has both functions of the upper spring 51 and the lower spring 14 of the fourth embodiment. A guide pin 76 for the compression coil spring 75 is fixed to the ejector pin 73 so as to stand from the bottom surface of the enlarged portion 22.

The retaining unit 5 of the present embodiment is configured such that the bottom surface of the inner holder 72 and the bottom surface of the enlarged portion 22 of the ejector pin 73 serve as pressure receiving surfaces against the compression coil spring 75, the compression coil spring 75 energizes the enlarged portion 22 of the ejector pin 73 against the ceiling surface of the outer holder 71, thereby maintaining the ejection force of the ejector pin 73, and the inner holder 72 slides in the center axis direction on the outer holder 71 in accordance with extension/contraction of the compression coil spring 75, whereby the holder 70 extends or contracts as a whole.

Next, operation of the injection molding die 100 including the retaining unit 5 of the present embodiment at the time of ejecting a molded article, and actions of the ejection mechanism 140 and the retaining unit 5, will be described. In die clamping (from injection step to cooling step), the bottom surface of the inner holder 72 is in contact with the movable-side attachment plate 114, and the distal end surface of the outer holder 71 is in contact with the bottom surface of the enlarged portion 22 of the ejector pin 73 (see FIG. 20). Therefore, the enlarged portion 22 of the ejector pin 73 is surely connected with the holder 70 via the ball plungers 12.

As shown in FIG. 21 and FIG. 22, in the ejection step after die opening, as the ejector plate 141 advances, the inner holder 72 slides on the outer holder 71 by the spring reaction force of the compression coil spring 75, and the compression coil spring 75 and the holder 70 extend as a whole, so that the spring reaction force of the compression coil spring 75 gradually decreases. When the ejector plate 141 is ejected by the distance L1, the step portion 24 of the ejector pin 73 abuts on the fixed plate 124 (see FIG. 22).

When the ejector plate 141 further advances from that state, the enlarged portion 22 of the ejector pin 73 is detached from the ball plungers 12, and the ejector plate 141 advances leaving the ejector pin 73 (see FIG. 23). As the ejector plate 141 further advances while the ejector pin 73 stays at rest, the distance between the bottom surface of the enlarged portion 22 of the ejector pin 73 and the bottom surface (pressure receiving surfaces against the compression coil spring 75) of the inner holder 72 is shortened, whereby the spring reaction force of the compression coil spring 75 is gradually increased again.

As described above, with the retaining unit 5 of the present embodiment, the spring reaction force of the compression coil spring 75 in a compressed state can be efficiently utilized at the initial stage of the ejection step. As the ejection step progresses, the compression coil spring 75 once extends and the spring reaction force thereof decreases, but the compression coil spring 75 is compressed again and the spring reaction force thereof increases. Therefore, a high ejection force of the ejector pin 73 can be maintained throughout a period from the initial stage to the final stage of the ejection step.

Figure 24:
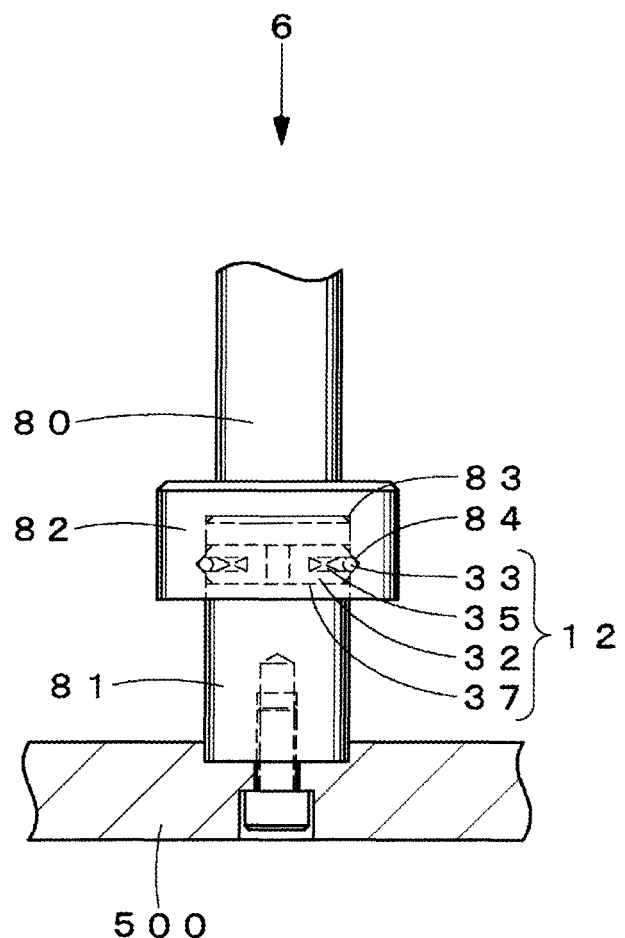
FIG. 24 is a front view of a main part of a retaining unit 6 according to a sixth embodiment of the present invention.

FIG. 24 is a front view of a main part of a retaining unit 6 according to a sixth embodiment of the present invention. The same members as those of the retaining unit 1 in the first embodiment shown in FIG. 1 to FIG. 4 are denoted by the same reference signs, and the description thereof is omitted. The retaining unit 6 of the present embodiment basically has the same configuration as the retaining unit 1 of the first embodiment, but instead of the ring-shaped member 11, has a columnar second member 81, and accordingly, the shape of a first member 80 is different from the ejector pin 10.

The second member 81 is a columnar member, and at the distal end portion thereof, ball plungers 12 as the pressing element are incorporated so as to protrude in the radial direction from the outer circumferential surface. The second member 81 is fixed to a plate member 500.

The first member 80 is a columnar member having an enlarged portion 82 at the proximal end thereof, and a circular opening 83 into which the distal end portion of the second member 81 is fitted is provided in the enlarged portion 82. A recess 84 having a groove shape to which balls 33 of the ball plungers 12 are fitted is formed around the inner circumferential surface of the circular opening 83.

The retaining unit 6 of the present embodiment is configured such that the first member 80 is engaged with the second member 81 via the ball plungers 12 and the recess 84 formed in the inner circumferential surface of the circular opening 83 of the first member 80. When a force at a predetermined level or higher is applied in the movement direction of the first member 80, the ball plungers 12 are detached from the recess 84 and the engagement with the second member 81 is released, whereby the first member 80 is allowed to move.

Shapes of the first member 80 and the second member 81 are not limited to the above-described shapes, and may be members having polygonal sectional shapes, for example.

Figure 25:
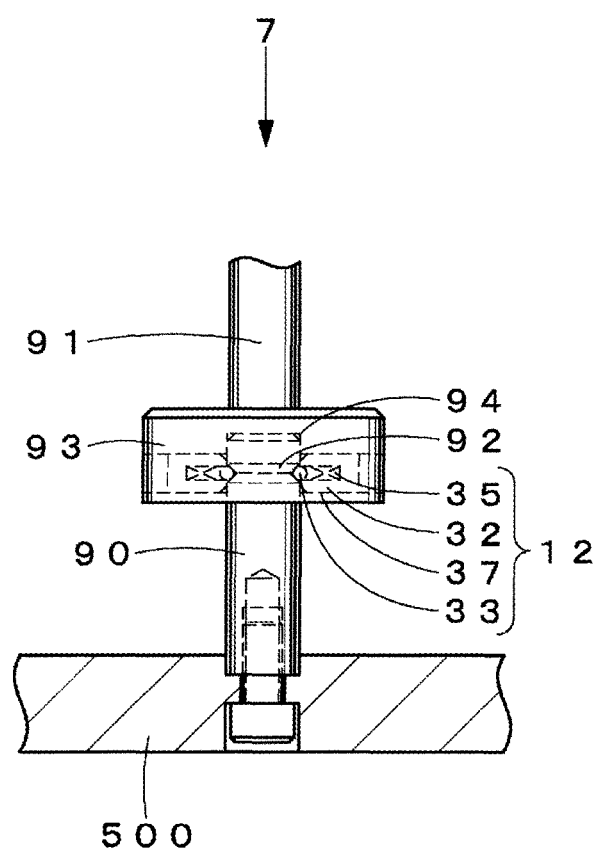
FIG. 25 is a front view of a main part of a retaining unit 7 according to a seventh embodiment of the present invention.

FIG. 25 is a front view of a main part of a retaining unit 7 according to a seventh embodiment of the present invention. The same members as those of the retaining unit 6 in the sixth embodiment shown in FIG. 24 are denoted by the same reference signs, and the description thereof is omitted. The retaining unit 7 of the present embodiment basically has the same configuration as the retaining unit 6 of the sixth embodiment, but a first member 90 is fixed in an unmovable state and a second member 91 in which ball plungers 12 are incorporated is configured to be movable.

In the retaining unit 7 of the present embodiment, the first member 90 is a columnar pin fixed to the plate member 500. A recess 92 to which balls 33 of the ball plungers 12 are fitted is formed in the outer circumferential surface of the distal end portion of the first member 90 over the entire circumference thereof. The second member 91 is a columnar rod and has an enlarged portion 93 at the proximal end thereof, and a circular opening 94 is formed in the enlarged portion 93. The ball plungers 12 are assembled to the enlarged portion 93 of the second member 91 so as to protrude in the radial direction from the inner circumferential surface of the circular opening 94. The first member 90 and the second member 91 are not limited to the above-described shapes, but may be members having polygonal sectional shapes, for example.

As shown in the present embodiment, in the retaining unit of the present invention, the first member may be used while being fixed in an unmovable manner, and the second member having the pressing element may be movable.

In the above-described explanation, the retaining unit of the present invention, the ejection mechanism of the molding die assembly including the retaining unit, the fixed-side die, the movable-side die, the molding die assembly, and the molded article, have been described with reference to the retaining units 1 to 7 of the first to seventh embodiments. However, the retaining unit of the present invention, the ejection mechanism of the molding die assembly including the retaining unit, the fixed-side die, the movable-side die, the molding die assembly, and the molded article are not limited to the above embodiments, but may be used while being modified within a range that does not deviate from the gist of the invention. For example, the retaining unit of the present invention is not limited to such usage as to be incorporated as a part of the ejection mechanism of the molding die assembly, but may be used for a simple lock mechanism and the like. Thus, the configuration and the shape thereof may be modified as appropriate in accordance with the intended usage.

In the retaining unit of the present invention, the pressing element for engaging the first member with the second member is not limited to the ball plungers 12 described in the above-described embodiments, but may be a plate spring or the like.

The retaining unit of the present invention is not limited to the configuration in which the ball plungers which are the pressing members are assembled with the second member by being screwed. For example, the following configuration may be employed: using a female thread portion formed to penetrate through the second member, and a fastening screw to be screwed to the female thread portion, a ball plunger that has a smaller diameter than the female thread portion and does not have a thread on the outer circumferential surface thereof is inserted into the female thread portion, and the fastening screw is screwed to the female thread portion from the proximal end side of the ball plunger, whereby the ball plunger is assembled with the second member. Where necessary, an element for preventing the ball plunger from coming off may be provided to the second member.

In the retaining unit of the present invention, the ejection mechanism of the molding die assembly including the retaining unit, the fixed-side die, the movable-side die, and the molding die assembly, a corner and a side edge of each component may be, for example, rounded or chamfered.

The materials of the constituent members used for the retaining unit of the present invention, the ejection mechanism of the molding die assembly including the retaining unit, the fixed-side die, the movable-side die, and the molding die assembly are not limited to specific materials, but the same materials as those of members used for known undercut processing mechanism and molding die assembly may be used as appropriate. However, the sliding surface of each constituent member is preferably formed from a material having a good slidability or a material that has been subjected to surface treatment so as to have a good slidability. Contact between the sliding surfaces is not limited to surface contact, but may be line contact or point contact.

The ejection mechanism of the molding die assembly including the retaining unit of the present invention, the fixed-side die, and the movable-side die are applicable to a molding die assembly that opens/closes in the horizontal direction, the vertical direction, or another direction.

The retaining unit of the present invention, the ejection mechanism of the molding die assembly including the retaining unit, the fixed-side die, the movable-side die, and the molding die assembly can be suitably used for a molding die assembly such as a die-casting die, a die press molding die assembly, and the like, other than the injection molding die.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are to be construed as included in the scope of the invention defined by claims.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCE NUMERALS 1, 2, 3, 4, 5, 6, 7 . . . retaining unit
10, 40, 50, 60, 73 . . . ejector pin (first member)
11 . . . ring-shaped member (second member)
12 . . . ball plunger (pressing element)
14, 51, 75 . . . compression coil spring
20 . . . body portion
22, 82, 93 . . . enlarged portion
23, 84, 92 . . . recess
33 . . . ball
37 . . . outer circumferential surface
70, 412 . . . holder
71, 413 . . . outer holder
72, 414 . . . inner holder
80, 90 . . . first member
81, 91 . . . second member
100, 200, 400, 410 . . . injection molding die
101 . . . fixed-side die
111 . . . movable-side die
113 . . . movable-side receiving plate
120 . . . undercut processing mechanism
140, 240 . . . ejection mechanism
141, 241 . . . ejector plate
142 . . . ejector pin
147 . . . recess
P . . . molded article

What is claimed is:

1. A retaining unit that is used while being assembled with or attached to a device having a movable element, the retaining unit comprising:
 a first member configured to be movable;
 a second member that is assembled with or attached to the movable element of the device; and a pressing element attached to the second member, and configured to press the first member to engage the first member with the second member, wherein the retaining unit is configured such that the first member can be detachably connected to the movable element of the device via the pressing element, connection of the first member with the movable element can be released when a force at a predetermined level or higher is applied in a movement direction of the first member, the first member being a columnar member with an axial direction thereof, the first member having a distal end portion at a distal end of the first member in the axial direction, a body portion, a proximal end in the axial direction, and an enlarged portion at the proximal end, wherein the enlarged portion is larger in diameter than the body portion, and wherein the body portion is larger in diameter than the distal end portion, the pressing element is incorporated such that only the enlarged portion of the first member is pressed by the pressing element, and the first member, the second member, and the pressing element constitute an assembly that can be handled as one unit when the assembly is assembled with or attached to the device.

2. The retaining unit as claimed in claim 1, wherein the enlarged portion of the first member has a recess into which at least a distal end portion of the pressing element is fitted, and the pressing element presses the first member in a state in which at least the distal end portion of the pressing element is fitted in the recess.

3. The retaining unit as claimed in claim 1, wherein the pressing element is detachably assembled with the second member.

4. The retaining unit as claimed in claim 1, wherein the second member is a ring-shaped member provided so as to surround a pressed portion of the first member, one or more of the pressing element are assembled with the second member, and each pressing element is configured such that the distal end portion thereof is projectable from an inner circumferential surface of the second member.

5. The retaining unit as claimed in claim 1, wherein the pressing element is a ball plunger.

6. The retaining unit as claimed in claim 1, wherein the pressing element is configured such that a pressing force thereof to the first member is adjustable in a state in which the pressing element is assembled with the second member.

7. The retaining unit as claimed in claim 6, wherein the pressing element is assembled with the second member via a fixing element, and the fixing element functions also as a means for adjusting the pressing force of the pressing element.

8. An ejection mechanism of a molding die assembly, in which the retaining unit as claimed in claim 1 is assembled, and which is for molding a molded article by a fixed-side die and a movable-side die, the ejection mechanism of the molding die assembly comprising an ejector plate, wherein the second member is fixed to the ejector plate, and the first member functions as an ejector pin.

9. The ejection mechanism of the molding die assembly as claimed in claim 8, wherein the first member is configured such that, when the ejector plate is moved to a predetermined position, the first member is connected with a movable-side receiving plate and is kept at a present position.

10. The ejection mechanism of the molding die assembly as claimed in claim 8, wherein the molding die assembly includes an undercut processing mechanism, and the first member is an ejector pin configured to push out the undercut processing mechanism.

11. The ejection mechanism of the molding die assembly as claimed in claim 8, further comprising one or more ejector pins fixed to the ejector plate or comprising a plurality of the retaining units assembled with the ejector plate, wherein the ejection mechanism of the molding die assembly is capable of multi-stage ejection.

12. The ejection mechanism of the molding die assembly as claimed in claim 8, further comprising one or a plurality of energizing element configured to energize the first member toward such a position where the first member is engaged with the second member, wherein the ejector plate has a recess into which the second member is fitted, and the second member is fixed in a state being fitted in the recess.

13. The ejection mechanism of the molding die assembly as claimed in claim 12, further comprising a holder which houses the energizing element, wherein the holder has an outer holder attached to the movable-side die or the ejector plate, and an inner holder slidably engaged with the outer holder, and the holder restricts a sliding amount of the inner holder relative to the outer holder, to restrict an extension amount of the housed energizing element within a predetermined range.

14. A fixed-side die and/or a movable-side die, comprising the ejection mechanism of the molding die assembly as claimed in claim 8.

15. A molding die assembly comprising the fixed-side die and/or the movable-side die as claimed in claim 14.

16. A retaining unit that is used while being assembled with or attached to a device having a movable element the retaining unit comprising:

a first member that is assembled with or attached to the movable element of the device;

a second member configured to be movable; and a pressing element attached to the second member, and configured to press the first member to engage the first member with the second member, wherein the retaining unit is configured such that the second member can be detachably connected to the movable element of the device via the pressing element, connection of the second member with the movable element can be released when a force at a predetermined level or higher is applied in a movement direction of the second member, and the first member being a columnar member with an axial direction thereof, the first member having a distal end portion at a distal end of the first member in the axial direction, a body portion, a proximal end in the axial direction, and an enlarged portion at the proximal end, wherein the enlarged portion is larger in diameter than the body portion, and wherein the body portion is larger in diameter than the distal end portion, and the pressing element is incorporated such that only the enlarged portion of the first member is pressed by the pressing element, and the first member, the second member, and the pressing element constitute an assembly that can be handled as one unit when the assembly is assembled with or attached to the device.

* * * * *